US012167981B2

(12) United States Patent
Brubaker

(10) Patent No.: US 12,167,981 B2
(45) Date of Patent: Dec. 17, 2024

(54) PATIENT TRANSPORT APPARATUS WITH ADJUSTABLE HANDLE

(71) Applicant: Stryker Corporation, Kalamazoo, MI (US)

(72) Inventor: Michael T. Brubaker, Portage, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/391,750

(22) Filed: Dec. 21, 2023

(65) Prior Publication Data

US 2024/0115439 A1 Apr. 11, 2024

Related U.S. Application Data

(63) Continuation of application No. 17/562,256, filed on Dec. 27, 2021, now Pat. No. 11,890,235, which is a continuation of application No. 16/454,234, filed on Jun. 27, 2019, now Pat. No. 11,241,345.

(60) Provisional application No. 62/690,409, filed on Jun. 27, 2018.

(51) Int. Cl.

| | |
|---|---|
| ***A61G 1/048*** | (2006.01) |
| ***A61G 1/013*** | (2006.01) |
| ***A61G 1/02*** | (2006.01) |

(52) U.S. Cl.
CPC ............. *A61G 1/048* (2013.01); *A61G 1/013* (2013.01); *A61G 1/02* (2013.01)

(58) Field of Classification Search
CPC ........... A61G 1/013; A61G 1/02; A61G 1/048
See application file for complete search history.

(56) References Cited

U.S. PATENT DOCUMENTS

| | | | | |
|---|---|---|---|---|
| 1,639,801 A | | 8/1927 | Heise | |
| 5,069,465 A | | 12/1991 | Stryker et al. | |
| 5,388,294 A | | 2/1995 | Reeder | |
| 5,806,111 A | | 9/1998 | Heimbrock et al. | |
| 5,987,671 A | * | 11/1999 | Heimbrock .......... | A61G 1/0225 280/764.1 |
| 6,016,580 A | * | 1/2000 | Heimbrock .......... | A61G 1/0287 5/610 |
| 6,286,165 B1 | * | 9/2001 | Heimbrock .......... | A61G 1/0275 280/98 |

(Continued)

FOREIGN PATENT DOCUMENTS

WO 2017194038 A1 11/2017

*Primary Examiner* — Robert G Santos
(74) *Attorney, Agent, or Firm* — Howard & Howard Attorneys PLLC

(57) ABSTRACT

A patient transport apparatus comprises a support structure. The support structure comprises a base, a frame, and a patient support surface to support a patient. One or more handle assemblies are coupled to the frame to maneuver the patient transport apparatus. Each handle assembly comprises a handle and a handle extension supporting the handle. The handle extension is configured to articulate relative to the frame from a stowed position to a use position such that the handle is adjacent to the frame in the stowed position and the handle is extended from the frame by the handle extension in the use position. The apparatus also includes a locking device comprising one or more locking elements configured to discretely lock and unlock the handle extension relative to the frame in the use position or the stowed position.

14 Claims, 32 Drawing Sheets

(56) References Cited

U.S. PATENT DOCUMENTS

| | | | | |
|---|---|---|---|---|
| 6,505,359 | B2 * | 1/2003 | Heimbrock | A61G 1/0268 280/764.1 |
| 6,668,402 | B2 | 12/2003 | Heimbrock | |
| 6,772,460 | B2 * | 8/2004 | Heimbrock | A61G 1/0268 5/610 |
| 7,039,971 | B2 | 5/2006 | Sebastien | |
| 7,398,571 | B2 | 7/2008 | Souke et al. | |
| 7,805,786 | B2 | 10/2010 | Lambarth | |
| 7,805,789 | B1 | 10/2010 | Dean | |
| 8,745,786 | B2 | 6/2014 | Andrienko et al. | |
| 9,510,981 | B2 | 12/2016 | Lambarth et al. | |
| 10,080,543 | B2 | 9/2018 | Coimbatore Renukanandhan et al. | |
| 10,369,063 | B2 | 8/2019 | Matheny et al. | |
| 10,406,044 | B2 | 9/2019 | Trepanier et al. | |
| 10,869,791 | B2 | 12/2020 | Matheny et al. | |
| 11,241,345 | B2 | 2/2022 | Brubaker | |
| 11,399,993 | B2 | 8/2022 | Matheny et al. | |
| 11,890,235 | B2 * | 2/2024 | Brubaker | A61G 1/048 |
| 2001/0039679 | A1 * | 11/2001 | Heimbrock | A61G 1/0225 5/86.1 |
| 2003/0024048 | A1 | 2/2003 | Heimbrock | |
| 2004/0093668 | A1 * | 5/2004 | Heimbrock | A61G 1/0275 5/81.1 R |
| 2005/0120485 | A1 | 6/2005 | Sebastien | |
| 2009/0039666 | A1 | 2/2009 | Lambarth | |
| 2011/0265262 | A1 | 11/2011 | Di Lauro et al. | |
| 2016/0374874 | A1 | 12/2016 | Trepanier et al. | |
| 2018/0280212 | A1 | 10/2018 | Matheny et al. | |
| 2019/0321244 | A1 | 10/2019 | Matheny et al. | |
| 2020/0000655 | A1 | 1/2020 | Brubaker et al. | |
| 2021/0069037 | A1 | 3/2021 | Matheny et al. | |
| 2022/0117804 | A1 | 4/2022 | Brubaker et al. | |
| 2022/0313509 | A1 | 10/2022 | Matheny et al. | |
| 2024/0115439 | A1 * | 4/2024 | Brubaker | A61G 1/013 |

* cited by examiner

PATIENT TRANSPORT APPARATUS WITH ADJUSTABLE HANDLE

CROSS-REFERENCE TO RELATED APPLICATIONS

The subject patent application is a Continuation of U.S. patent application Ser. No. 17/562,256 filed on Dec. 27, 2021 and issued as U.S. Pat. No. 11,890,235 on Feb. 6, 2024, which is a Continuation of U.S. patent application Ser. No. 16/454,234 filed on Jun. 27, 2019 and issued as U.S. Pat. No. 11,241,345 on Feb. 8, 2022, which claims priority to and all the benefits of U.S. Provisional Patent Application No. 62/690,409 filed on Jun. 27, 2018, the disclosures of each of which are hereby incorporated by reference in their entirety.

BACKGROUND

Patient transport apparatuses facilitate care of patients in a health care setting. Patient transport apparatuses comprise, for example, hospital beds, stretchers, cots, wheelchairs, and chairs. A conventional patient transport apparatus comprises a support structure having a base, a frame, and a patient support surface upon which the patient is supported. The patient transport apparatus may also comprise a lift device arranged to lift and lower the patient support surface relative to a floor surface. Handles on the frame facilitate maneuvering of the patient transport apparatus.

Occasionally, when the patient support surface has been lowered via the lift device to its lowest height, the handles are difficult to reach and/or are difficult to apply leverage to in order to maneuver the patient transport apparatus. Furthermore, users of varying heights may be maneuvering the same patient transport apparatus, which can result in some users having difficulty grasping and/or otherwise manipulating the handles to maneuver the patient transport apparatus.

A patient transport apparatus with one or more handles designed to overcome one or more of the aforementioned challenges is desired.

DETAILED DESCRIPTION

Figure 1:
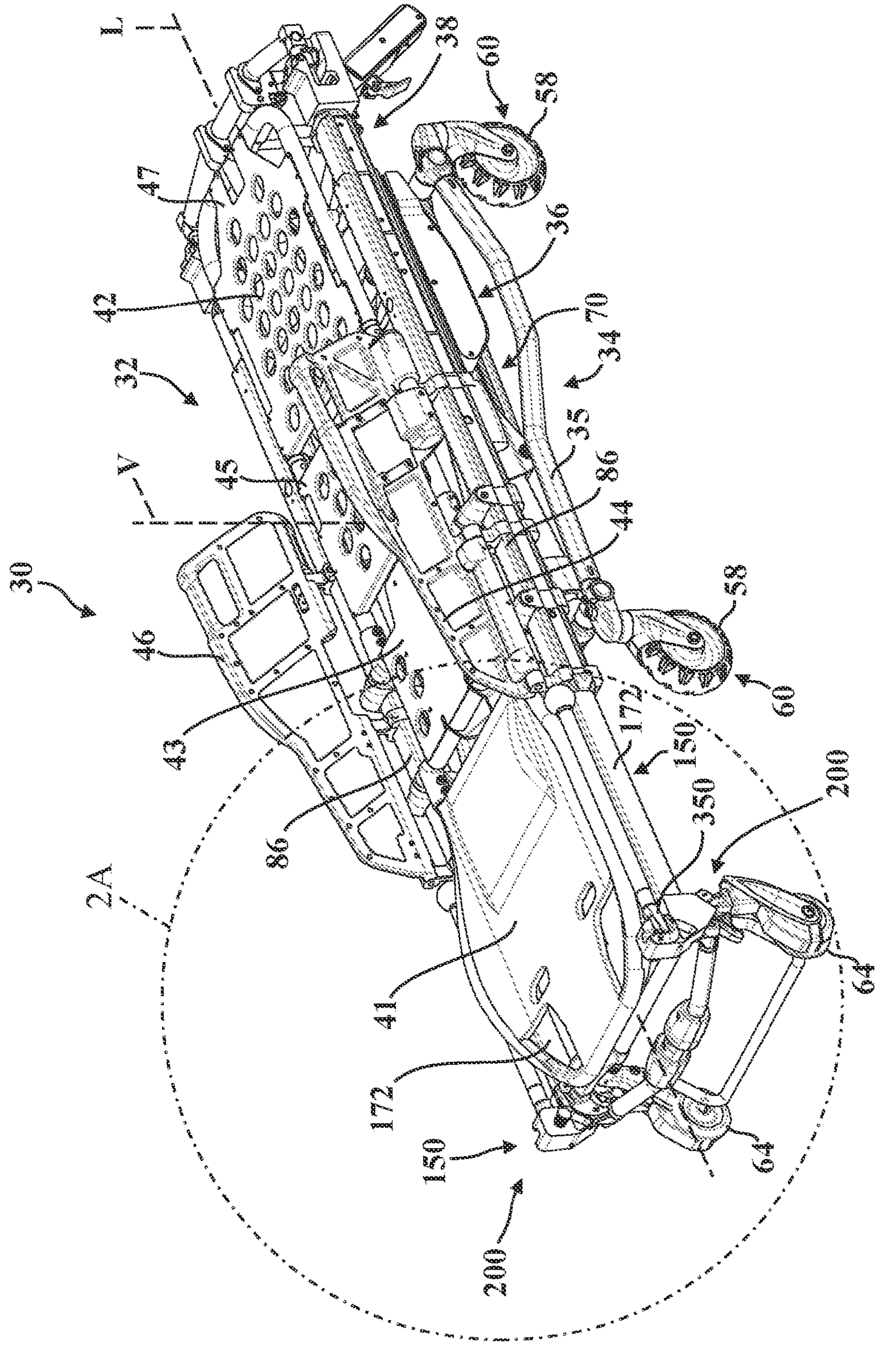
FIG. 1 is a perspective view of a patient transport apparatus at its lowest height with each of a first and second handle assembly in a stowed position.
Figure 2A:
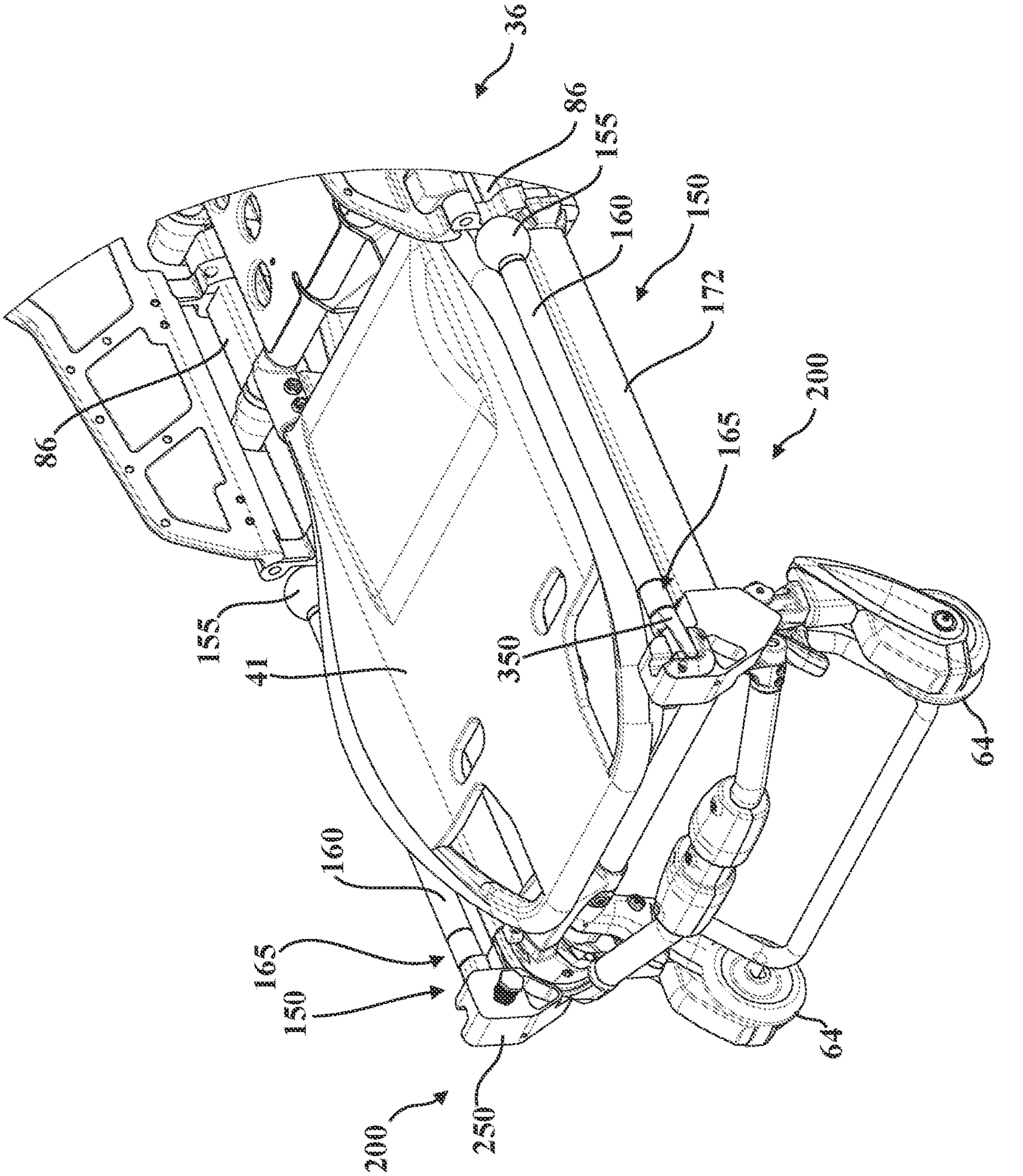
FIG. 2A is a close-up perspective view of a portion of FIG. 1.
Figure 2B:
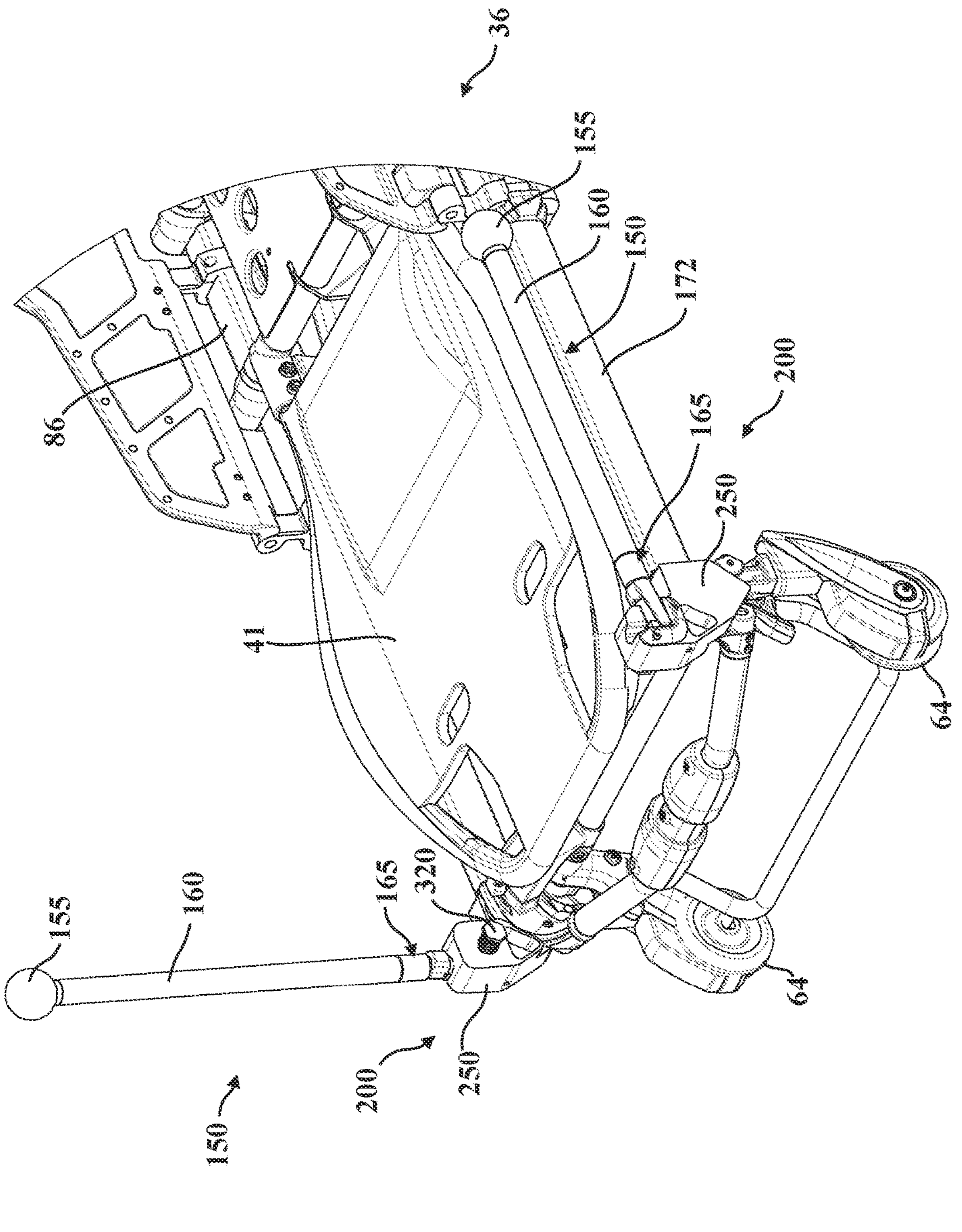
FIG. 2B is a close-up perspective view of a portion of FIG. 1 with the first handle assembly in the stowed position and with the second handle assembly in a use position.
Figure 2C:
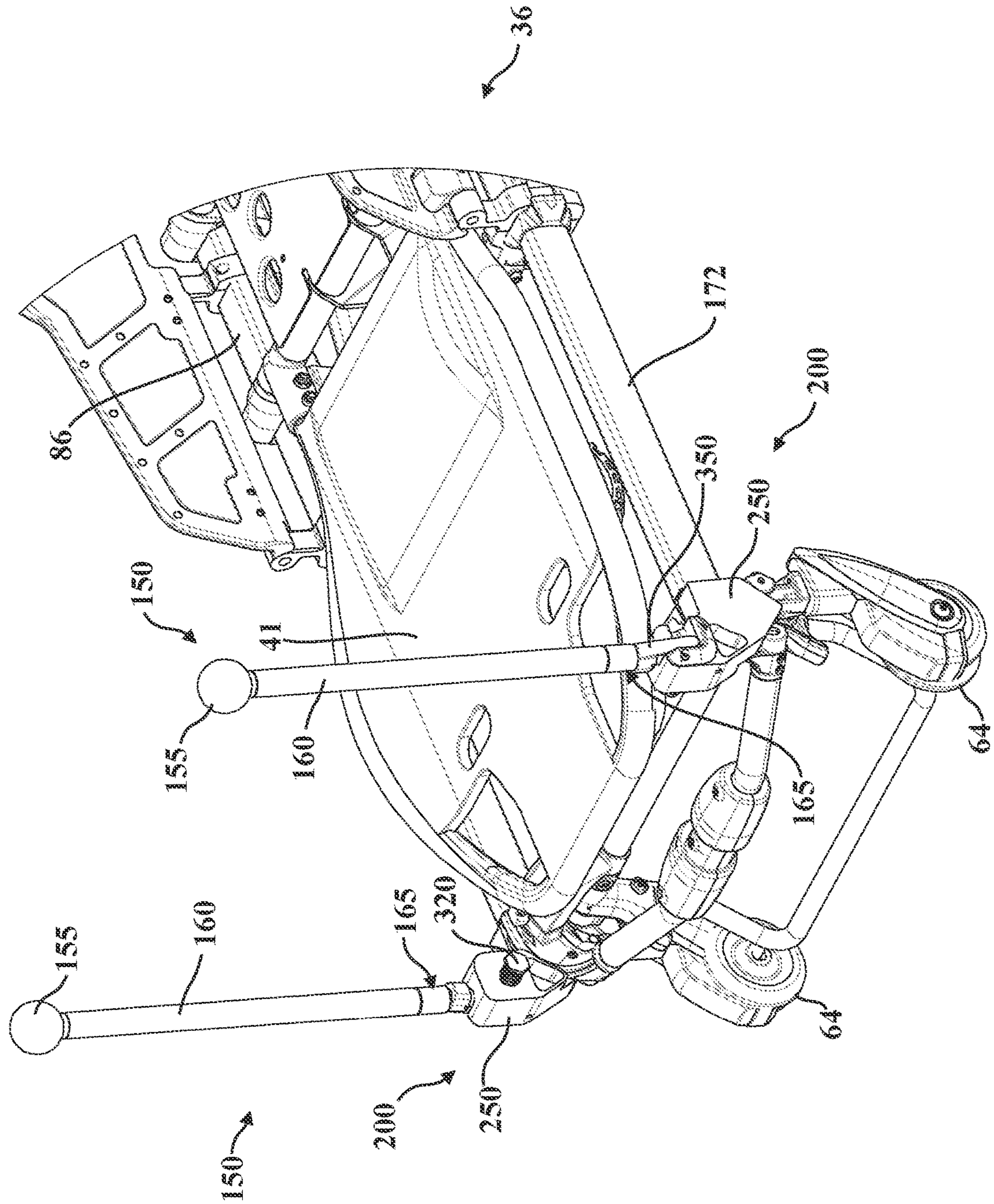
FIG. 2C is a close-up perspective view of a portion of FIG. 1 with each of the first and second handle assemblies in the use position.
Figure 3A:
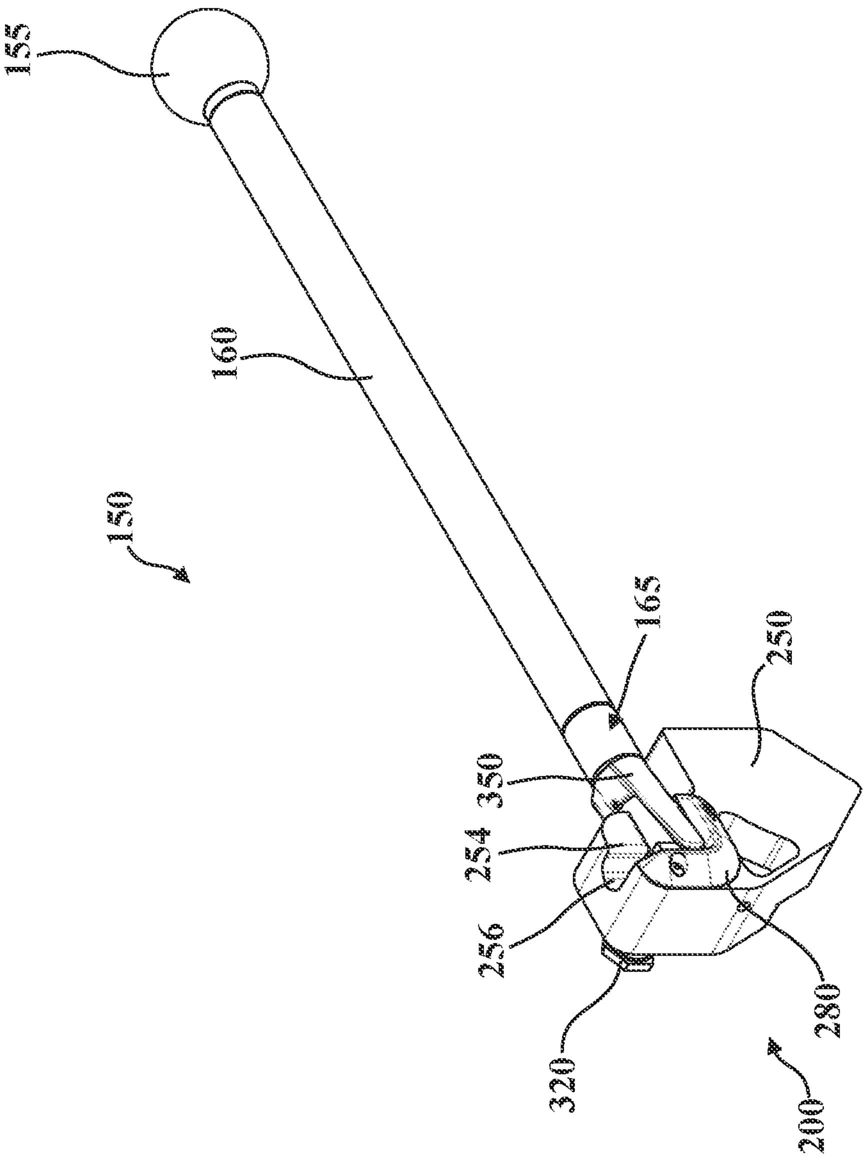
FIG. 3A is a perspective view of the first handle assembly in the stowed position.
Figure 3B:
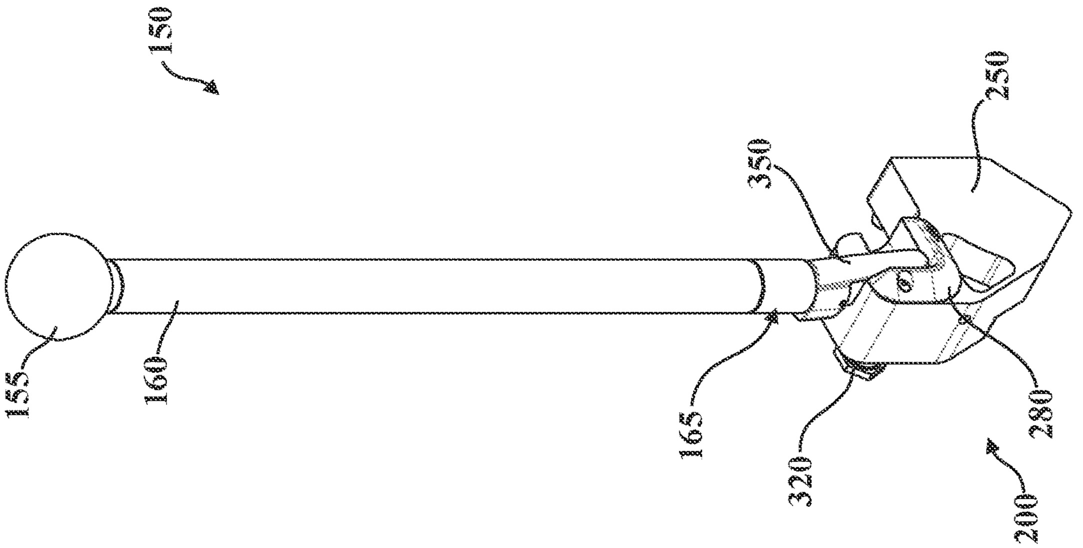
FIG. 3B is a perspective view of the first handle assembly in the use position.
Figure 4:
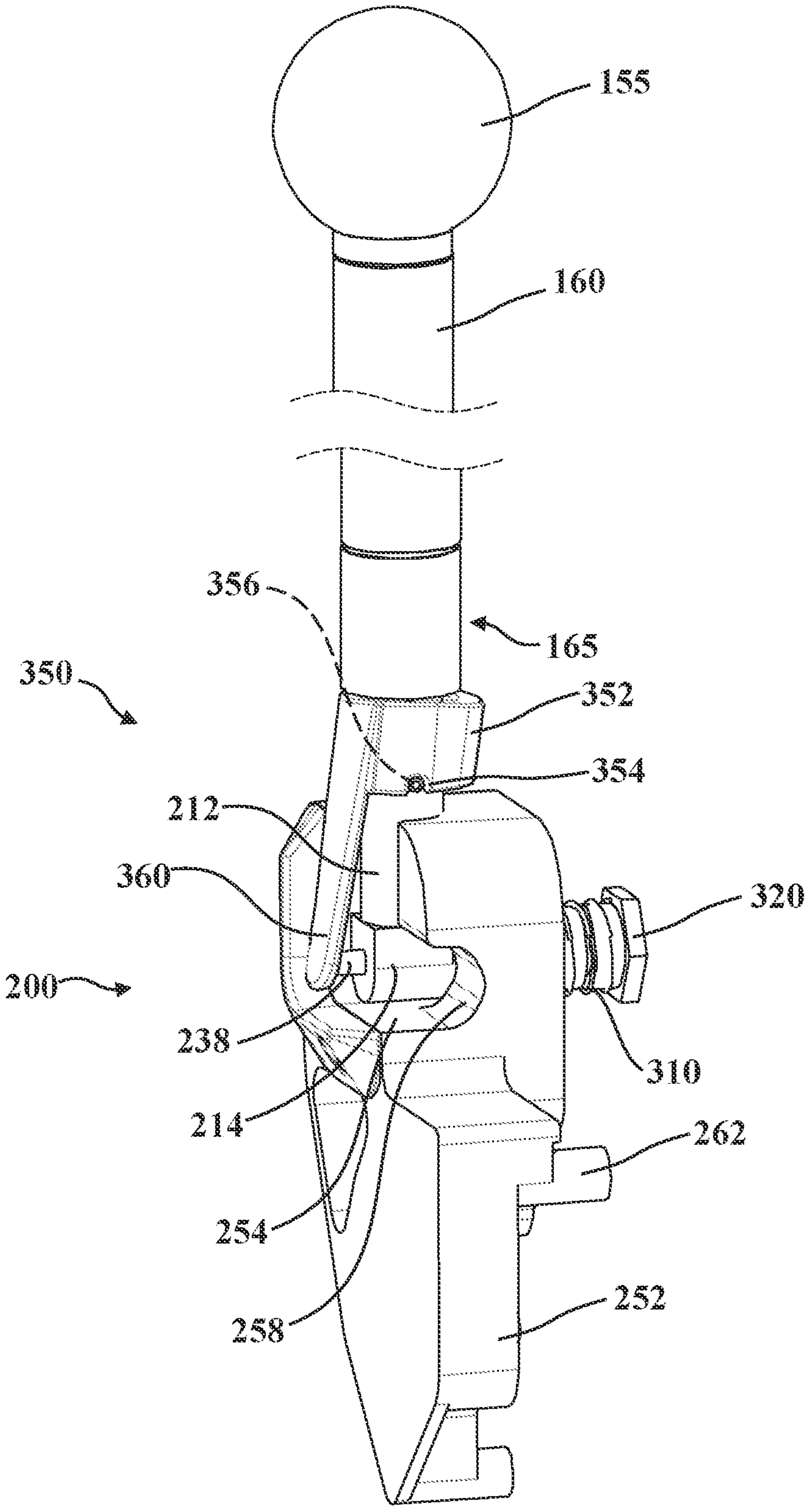
FIG. 4 is a side perspective view of the first handle assembly.

Referring to FIG. 1, a patient transport apparatus 30 is shown for supporting a patient in a health care setting. The patient transport apparatus 30 may comprise a hospital bed, stretcher, cot, wheelchair, chair, or similar apparatus utilized in the care of a patient. In the embodiment shown in FIG. 1, the patient transport apparatus 30 comprises a cot that is utilized to transport patients, such as from an emergency site to an emergency vehicle (e.g., an ambulance).

The patient transport apparatus 30 shown in FIG. 1 comprises a support structure 32 that provides support for the patient. The support structure 32 comprises a base 34 and a support frame 36. The base 34 comprises a base frame 35. The support frame 36 is spaced above the base frame 35. The support structure 32 also comprises a patient support deck 38 disposed on the support frame 36. The patient support deck 38 comprises several sections, some of which are capable of articulating relative to the support frame 36, such as a back section 41, a seat section 43, a leg section 45, and a foot section 47. The patient support deck 38 provides a patient support surface 42 upon which the patient is supported.

The base 34, support frame 36, patient support deck 38, and patient support surface 42 each have a head end and a foot end corresponding to designated placement of the patient's head and feet on the patient transport apparatus 30. The support frame 36 comprises a longitudinal axis L along its length from the head end to the foot end. The support frame 36 also comprises a vertical axis V arranged crosswise (e.g., perpendicularly) to the longitudinal axis L along which the support frame 36 is lifted and lowered relative to the base 34. The construction of the support structure 32 may take on any known or conventional design, and is not limited to that specifically set forth above. In addition, a mattress (not shown) may be provided in certain embodiments, such that the patient rests directly on a patient support surface of the mattress while also being supported by the patient support surface 42.

Side rails 44, 46 are coupled to the support frame 36 and thereby supported by the base 34. A right side rail 44 is positioned at a right side of the support frame 36. A left side rail 46 is positioned at a left side of the support frame 36. If the patient transport apparatus 30 is a hospital bed there may be more side rails. The side rails 44, 46 may be fixed to the support frame 36 or may be movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

Wheels 58 are coupled to the base 34 to facilitate transport over floor surfaces. The wheels 58 are arranged in each of four quadrants of the base 34 adjacent to corners of the base frame 35. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

A pair of loading wheels 64 may be coupled to the support frame 36 to assist with loading of the patient transport apparatus 30 into the emergency vehicle and unloading of the patient transport apparatus 30 out of the emergency vehicle. In the embodiment shown, the loading wheels 64 are arranged nearer the head end than the foot end, but the loading wheels 64 may be placed in other locations to facilitate loading and/or unloading of the patient transport apparatus 30 into and out of the emergency vehicle, or for other purposes.

A lift device 70 is configured to raise and lower the patient support surface 42 between minimum and maximum heights relative to the floor surface and intermediate heights therebetween. The lift device 70 may be configured to operate in the same manner or a similar manner as the lift mechanisms shown in U.S. Pat. No. 7,398,571 or U.S. Pat. No. 9,510,981, both hereby incorporated by reference in their entirety.

As also shown in FIG. 1, the support frame 36 includes rails 86 positioned along the right and left side of the support frame 36, typically at a position corresponding to the seat section 43, leg section 45, or foot section 47. The support frame 36 may also include telescoping rails 172 positioned at the back section 41 of the support frame 36, with one of the telescoping rails 172 coupled, in a telescoping manner, to a respective one of the rails 86.

As also shown in FIGS. 1 and 2A-2C, a handle assembly 150 is shown coupled to a respective one of the telescoping rails 172 of the support frame 36 via a locking device 200. In particular, one, two, or more such handle assemblies 150 may be coupled to the support frame 36 at the head end of the patient transport apparatus 30. In the embodiment shown, a pair of handle assemblies 150 are illustrated. One or more handle assemblies 150 may also be coupled to the support frame 36 at the foot end, or at any other suitable location on the patient transport apparatus 30.

As best shown in FIGS. 3A-6, each one of the handle assemblies 150 includes a handle extension 160 extending from and supporting a graspable handle 155, with a distal end portion 165 of the handle extension 160 being opposite the handle 155 and respectively coupled to the locking device 200. Accordingly, the handle assemblies 150 are coupled to the support frame 36 via the locking device 200, as will be described further below. The handle extension 160 is configured to articulate relative to the support frame 36 from a stowed position (FIG. 2A) to a use position (FIG. 2C) such that the handle 155 is adjacent the support frame 36 in the stowed position and is extended upwardly from the telescoping rails 172 by the handle extension 160 in the use position. When the handle assemblies 150 are in the use position, a user can apply leverage on the handle assemblies 150 in order to maneuver the patient transport apparatus 30 in a desired direction, such as by pushing or pulling the handle assemblies 150.

Figure 5:
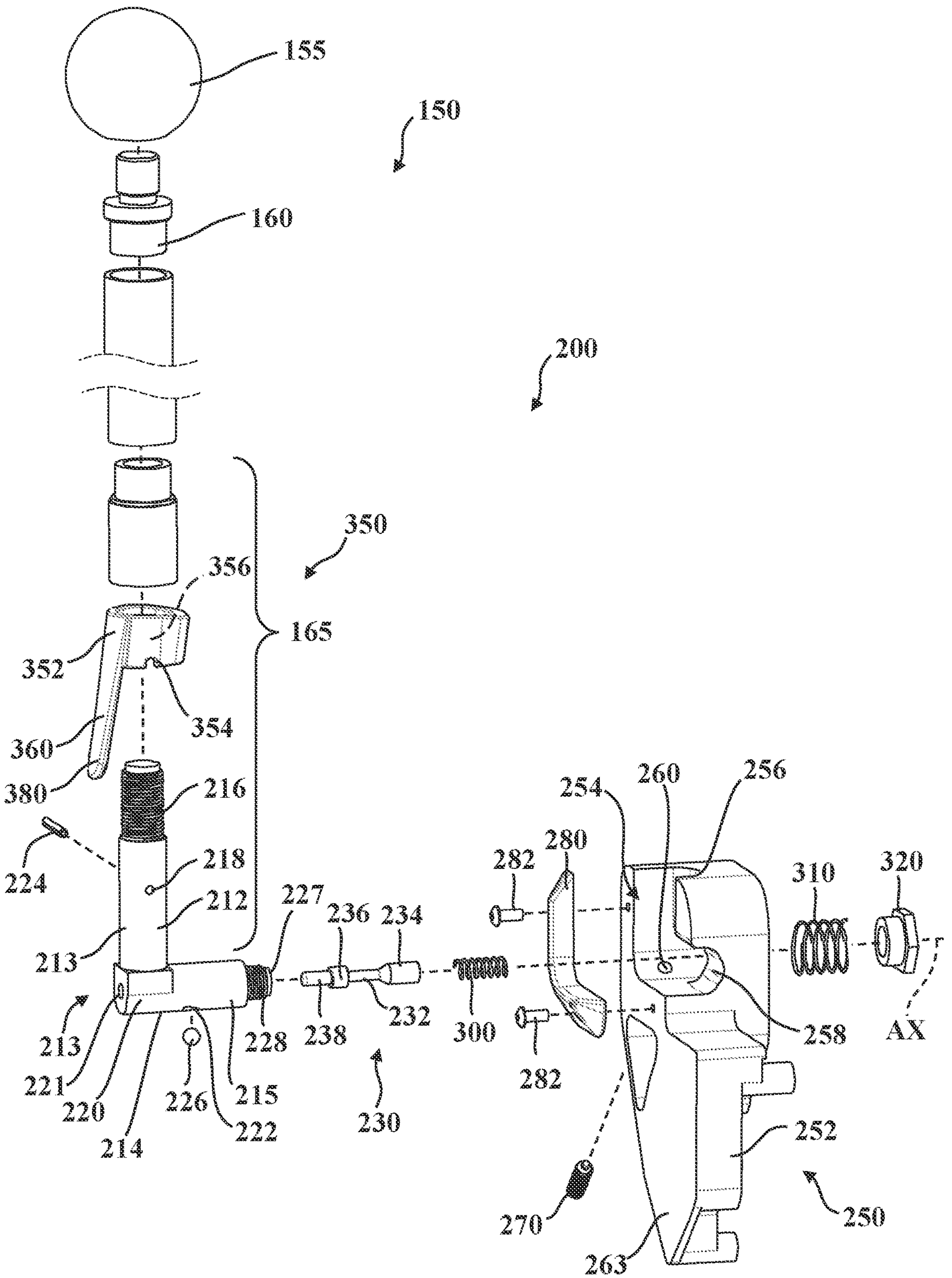
FIG. 5 is an exploded perspective view of the first handle assembly of FIG. 4 shown generally in a use position.
Figure 6:
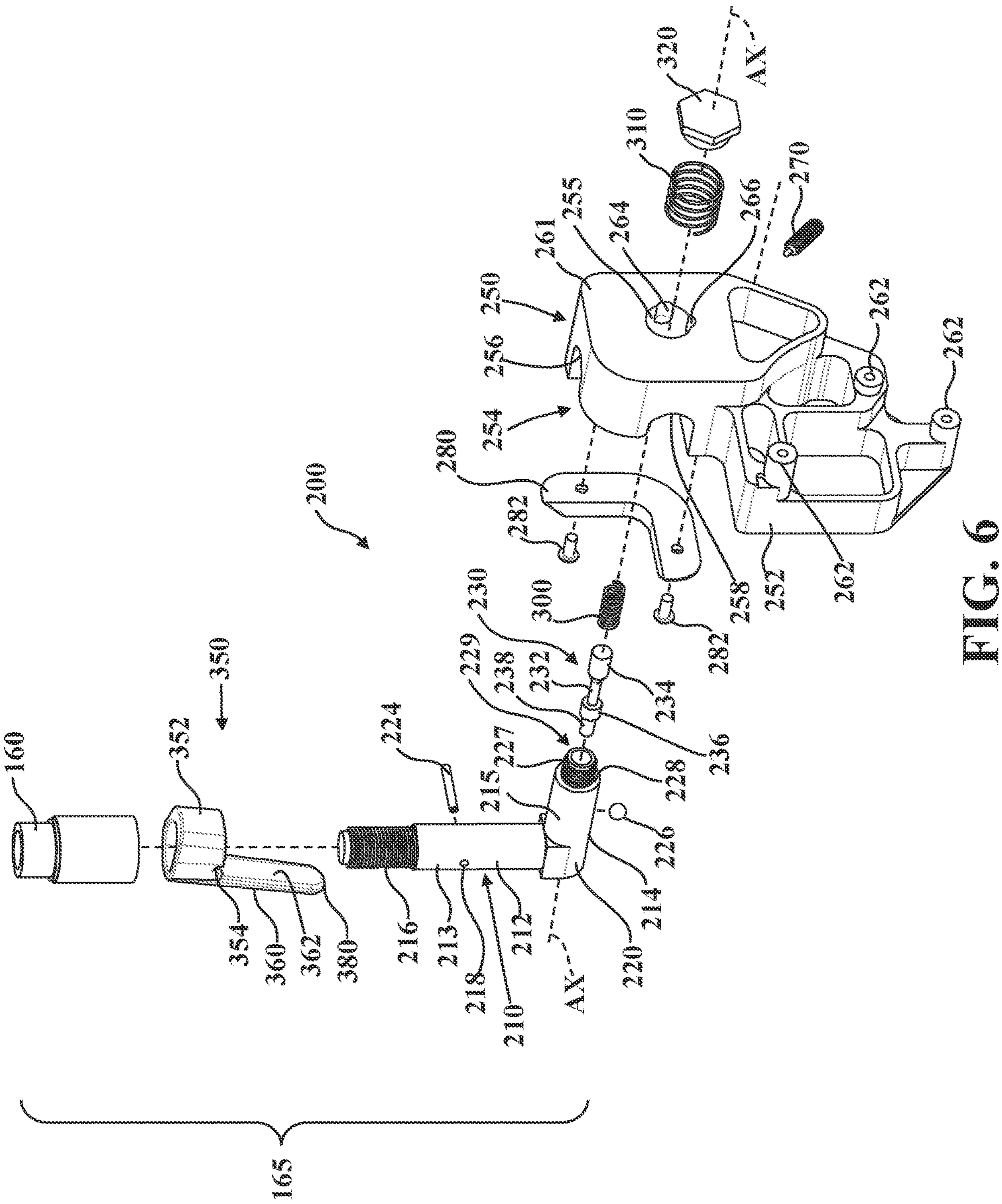
FIG. 6 is another exploded perspective view of portions of the first handle assembly of FIG. 4 shown generally in a use position.

Referring specifically to FIGS. 5 and 6, the distal end portion 165 of the handle extension 160 comprises a handle support member 210 that includes a first section 212 (shown in a vertical orientation in FIGS. 5 and 6) and a second section 214 extending transverse to the first section 212 (shown in a horizontal orientation in FIGS. 5 and 6). The first section 212 of the handle support member 210, which may be hollow, solid, or any suitable configuration, also includes a pair of opposing first openings 218 for receipt of a pivot structure, such as dowel pin 224. The outer surface 213 of the first section 212 is curved so as to form a generally circular cross-sectional shape. Other shapes are also contemplated.

The outer surface 213 also includes a threaded outer surface 216 that is configured to be engaged with a corresponding threaded internal surface 170 of a separate tubular section of the handle extension 160 (shown in FIGS. 12A-12C) so as to secure the separate tubular section of the handle extension 160 to the handle support member 210. While corresponding threaded surfaces are illustrated in the Figures to secure the handle support member 210 to the separate tubular section of the handle extension 160, other methods are contemplated, and are not limited to the configuration provided in FIGS. 5 and 6. In other embodiments, the handle extension 160 may be formed in one piece extending from the handle 155 to the second section 214 and may be solid, hollow, combinations thereof, or any suitable configuration.

In the version shown, the second section 214 of the handle support member 210 is hollow and receives the first section 212 at an intersecting region 220. In alternative embodiments, the first section 212 and second section 214 are integrally formed. The inner end 227 of the second section 214 of the handle support member 210 includes a threaded outer surface 228 that is configured to be engaged with a corresponding threaded internal surface 322 of a cap 320 (shown in FIGS. 10A-10F and 12A-12F) so as to secure the cap 320 to the handle support member 210. The second section 214 also partially defines an axis AX. While corresponding threaded surfaces are illustrated in the Figures to secure the handle support member 210 to the cap 320, other methods of coupling the handle support member 210 to the cap 320 are contemplated, and are not limited to the configuration provided in the Figures.

As also best shown in FIGS. 5-6, each locking device 200 includes one or more locking elements operable between locked and unlocked states to discretely lock or unlock the handle extension 160 relative to the support frame 36 in the use position or in the stowed position. In the embodiment shown, the one or more locking elements comprise a ball bearing 226 and a spring-loaded plunger 230. The locking device 200 further includes, in the version shown, a base member 250, the cap 320, and springs 300, 310.

The hollow second section 214 of the handle support member 210 defines an interior space 229 (shown in FIGS. 10A-10F and 12A-12F) extending from the inner end 227 to the intersecting region 220. The second section 214 includes a pin opening 221 (shown in FIGS. 12A-12C) located at the intersecting region 220 that extends coaxial with a portion of the interior space 229. In addition, the second section 214 also includes a ball opening 222 that is configured to receive the ball bearing 226. Similar to the first section 212, an outer surface 215 of the second section 214 may also be generally curved so to form a circular cross-section or may be any suitable shape.

The base member 250 is configured to receive the handle extension 160 in an upright orientation, corresponding to a use position, or alternatively receive the handle extension 160 in a stowing orientation, corresponding to the stowed position. The base member 250 includes a body portion 252 having a recessed region 254 that includes a pair of spaced apart notches, such as semicircular notches 256, 258 shaped to receive the handle extension 160 in the use and stowed positions, as described below.

An opening 260 extends through the body portion 252 and opens into the recessed region 254. A biasing plunger 270 (see FIG. 6) is positioned in the opening 260 to act against the outer surface 215 of the second section 214 to facilitate movement of the handle extension 160 between the stowed and use positions.

One or more threaded hollow posts 262 extend from a rearward side 261 (see FIG. 6) of the body portion 252. The posts 262 are configured to receive fastening devices (not shown) that are used to secure the body portion 252 to the telescoping rail 172 or otherwise to secure the body portion 252 to the support frame 36. The body portion 252 also includes an additional central opening 255 through which the second section 214 of the handle support member 210 extends, after assembly, such that threaded outer surface 228 may be coupled to corresponding threaded internal surface 322 of the cap 320. When assembled, the cap 320 is spring-biased away from the rearward side 261 of the body portion 252 by the spring 310. Owing to the cap 320 being connected to the handle support member 210, which is part of the handle extension 160, the spring 310 thus biases the handle extension 160 toward the recessed region 254.

The central opening 255 also includes a pair of spaced apart locking grooves 264, 266, with the first locking groove 264 configured to receive the ball bearing 226 when the handle assembly 150 is in the stowed position (corresponding to FIGS. 7A, 8, 9, 10A, 11A and 12A) and the second locking groove 266 configured to receive the ball bearing 226 when the handle assembly 150 is in the use position (corresponding to FIGS. 7F, 10F, 11F and 12F).

A rod guard 280 may also be secured to a frontward side 263 (see FIG. 5) of the body portion 252 utilizing one or more fastening devices, shown in the Figures as a pair of screws 282. The rod guard 280 is configured to assist in placing the handle extension 160 within a respective one of the semicircular notches 256, 258, depending upon whether the handle assembly 150 is in the use position (wherein the handle extension 160 is in semicircular notch 256) or stowed position (wherein the handle extension 160 is in semicircular notch 258).

The plunger 230 is positioned within the interior space 229 of the handle support member 210 and includes a recessed section 232 disposed between a distal raised section 234 and a proximal raised section 236. A release pin section 238 extends from the proximal raised section 236 opposite the distal raised section 234. The spring 300 acts between the plunger 230 and the cap 320 such that the plunger 230 is biased in a lateral direction towards the pin opening 221 so that that the release pin section 238 extends through the pin opening 221 and is engaged with a manual release actuator 350.

A manual release actuator 350 is coupled to the handle extension 160 at the distal end portion 165. The manual release actuator 350 is carried by the handle extension 160 for movement with the handle extension 160 between the stowed position and the use position. The manual release actuator 350 is positioned on the outer surface 213 of the handle support member 210 and includes a base ring portion 352 having a pair of semicircular arches 354, 356 (356 shown in phantom in FIG. 5 as being opposite semicircular arch 354) that are configured to be seated on and supported by the dowel pin 224.

The manual release actuator 350 also includes an actuating lever 360 that extends from the base ring portion 352 and includes an inner surface 362 (see FIG. 6) shaped to be congruent with a portion of the outer surface 213 of the first section 212 of the handle support member 210. A portion of the inner surface 362 is engaged with the release pin section 238 (see FIGS. 12A-12C) of the plunger 230 that is extending through the pin opening 221. When fully assembled, the manual release actuator 350 may pivot about an axis defined along the length of the dowel pin 224 between a depressed position (as shown in FIGS. 7B-7E, 10B-10E, and 12B-12E) and a non-depressed position (as shown in FIGS. 7A, 7F, 10A, 10F, 12A, and 12F). In the depressed position, the inner surface 362 of the actuating lever 360 is substantially aligned and adjacent to the outer surface 213 of the first section 212 of the handle support member 210, while in the non-depressed position the inner surface 362 of the actuating lever 360 is generally angled with respect to the outer surface 213 of the first section 212 such that the portion of the inner surface 362 nearer to the base ring portion 352 is closer to the outer surface 213 than a distal end 380 of the actuating lever 360 (see the difference between FIGS. 12A and 12B).

FIGS. 7A-7F illustrate one example of the manner in which the handle assembly 150 may be moved by a user, such as via a one-handed operation (hand 700 is shown in phantom in FIG. 7A positioned with the thumb 750 positioned on the actuating lever 360), from a stowed position (FIG. 7A), in which the handle assembly 150 is horizontal and aligned along the length of the telescoping rail 172, to a use position (FIG. 7F), in which the handle assembly 150 is aligned along its length approximately normal to the length of the telescoping rail 172 and is available for the user to apply leverage to the handle assembly 150 to maneuver (i.e., move) the patient transport apparatus 30.

Figure 7A:
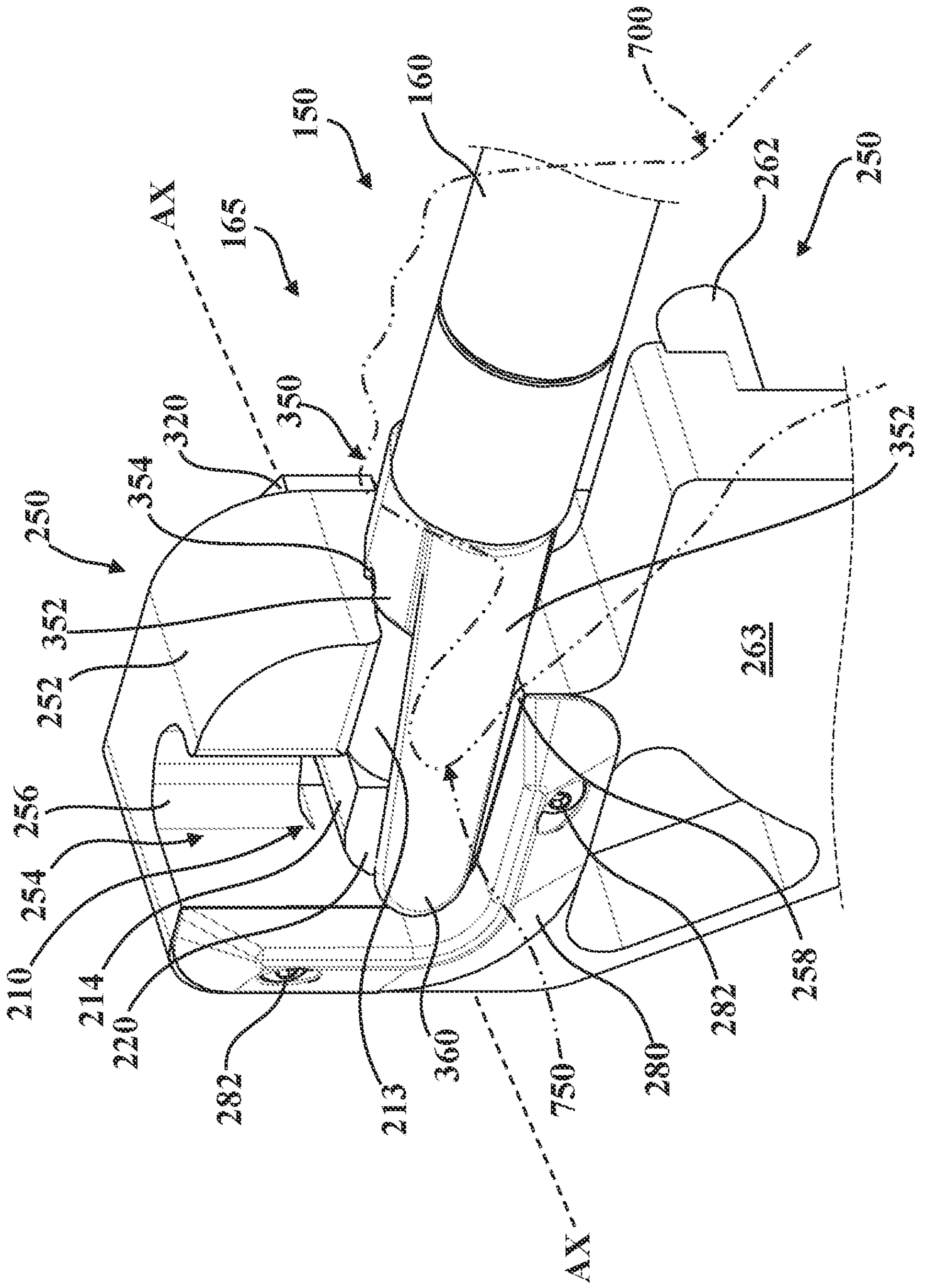
FIGS. 7A-7F are perspective views illustrating movement of the first handle assembly from the stowed position (FIG. 7A) to the use position (FIG. 7F).
Figure 7B:
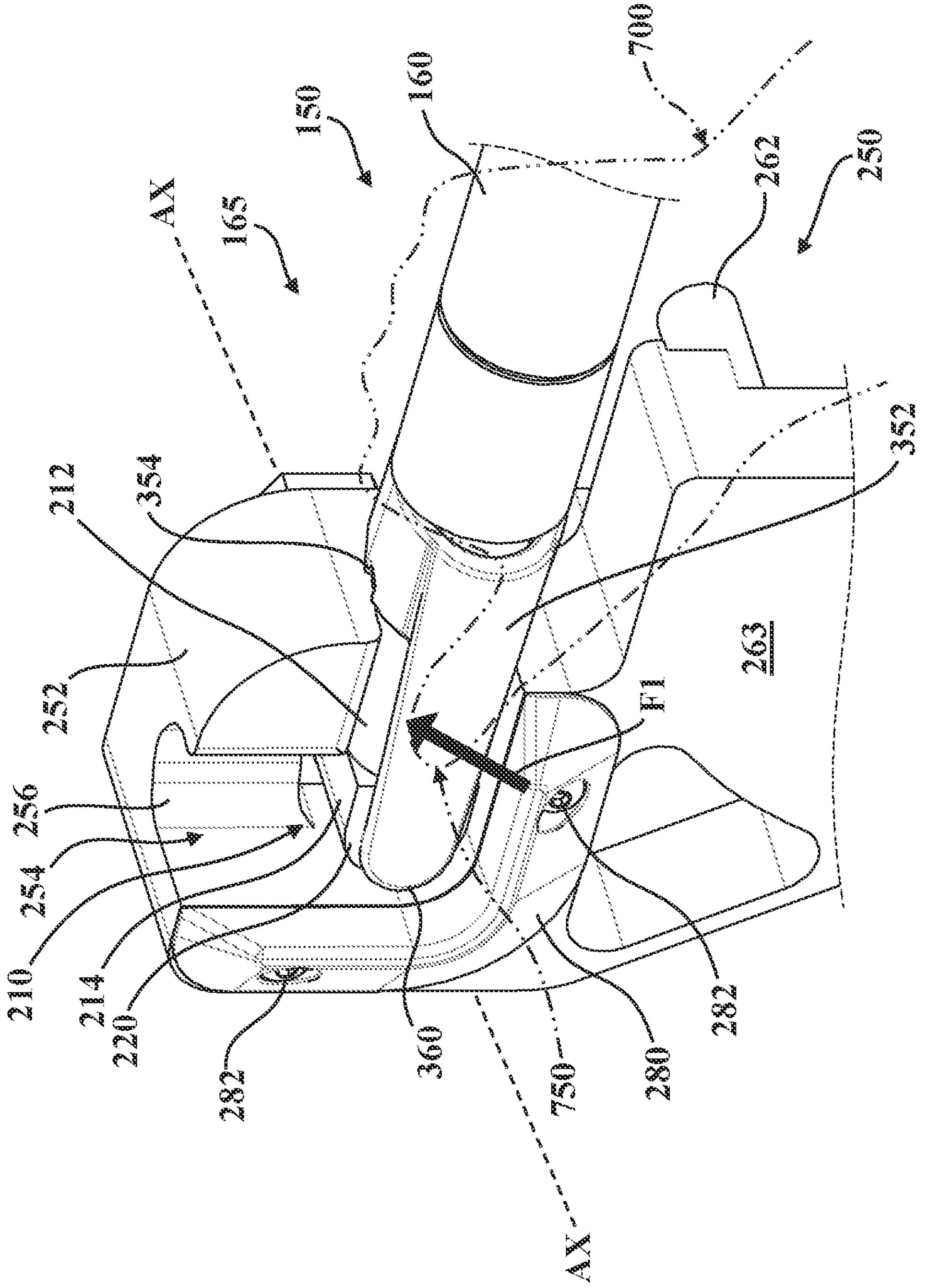
Figure 7C:
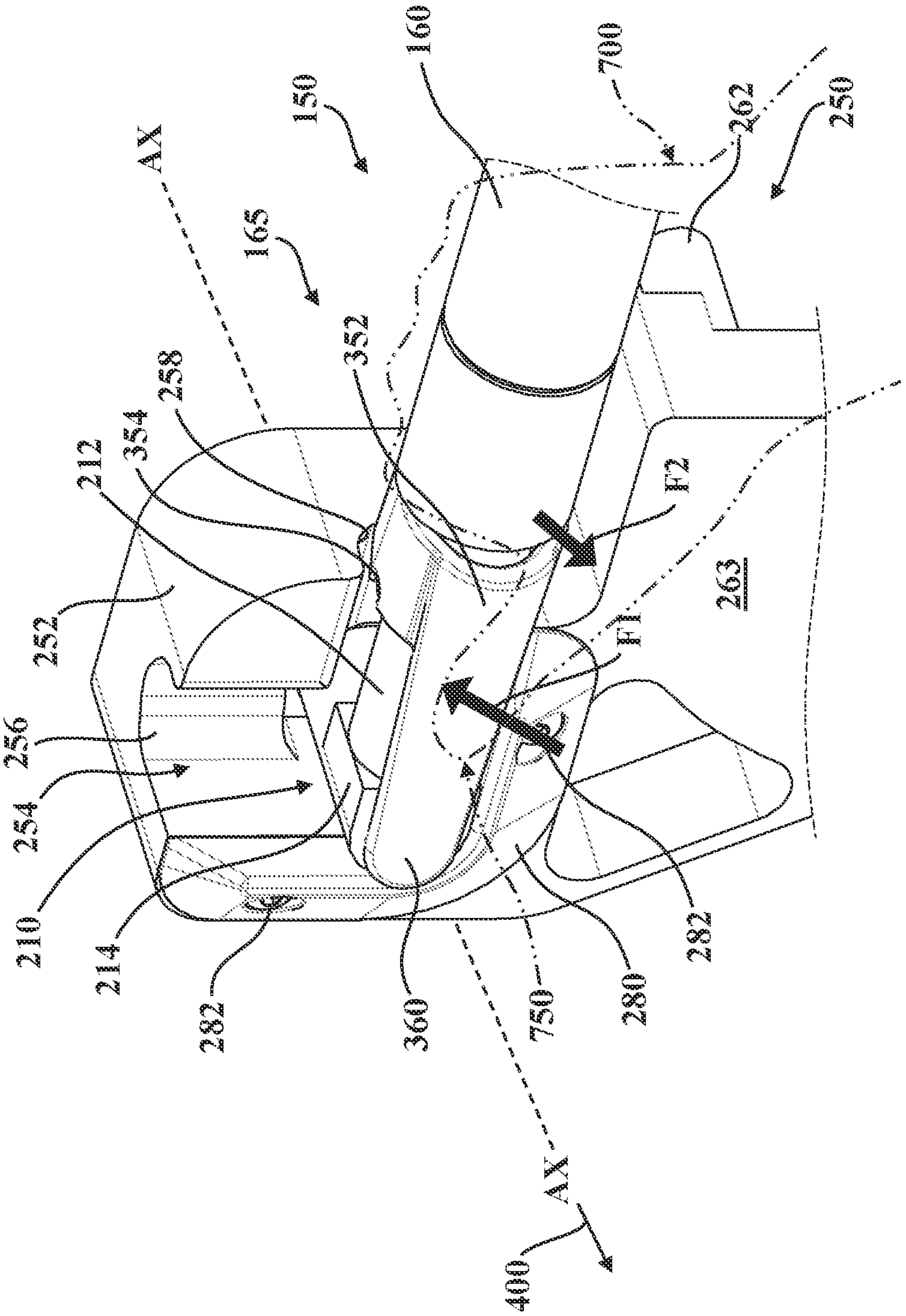
Figure 7D:
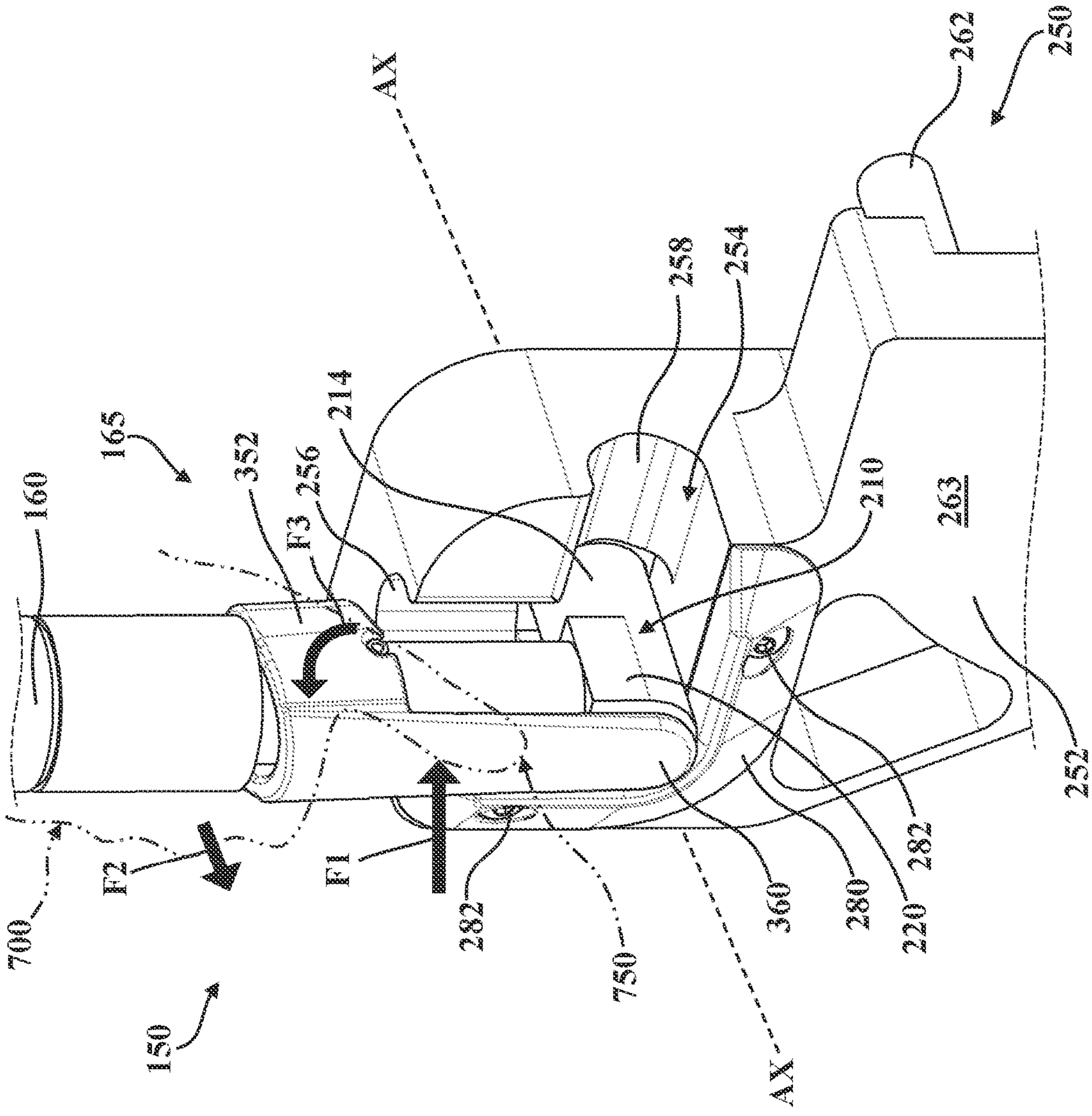
Figure 7E:
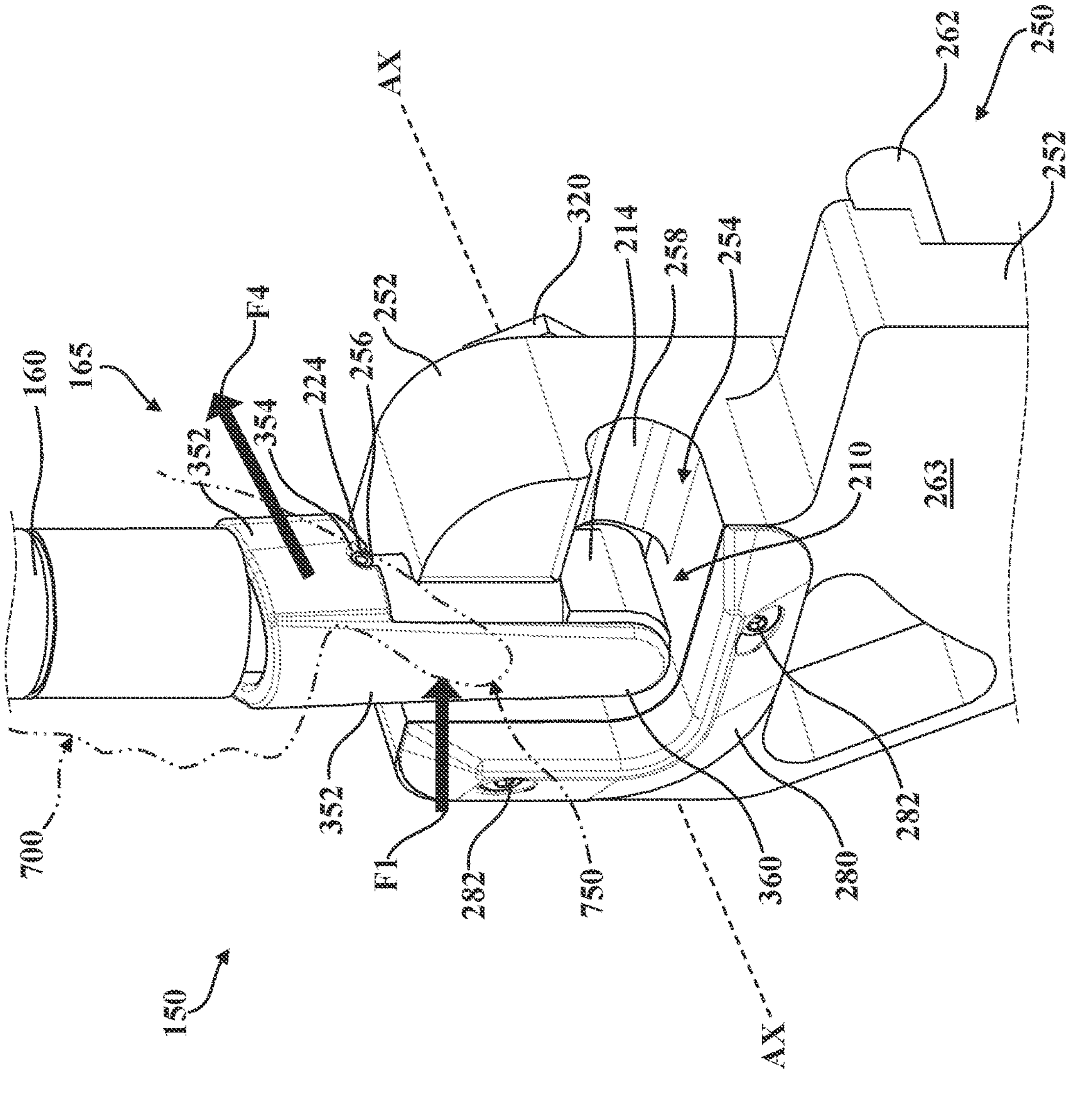
Figure 7F:
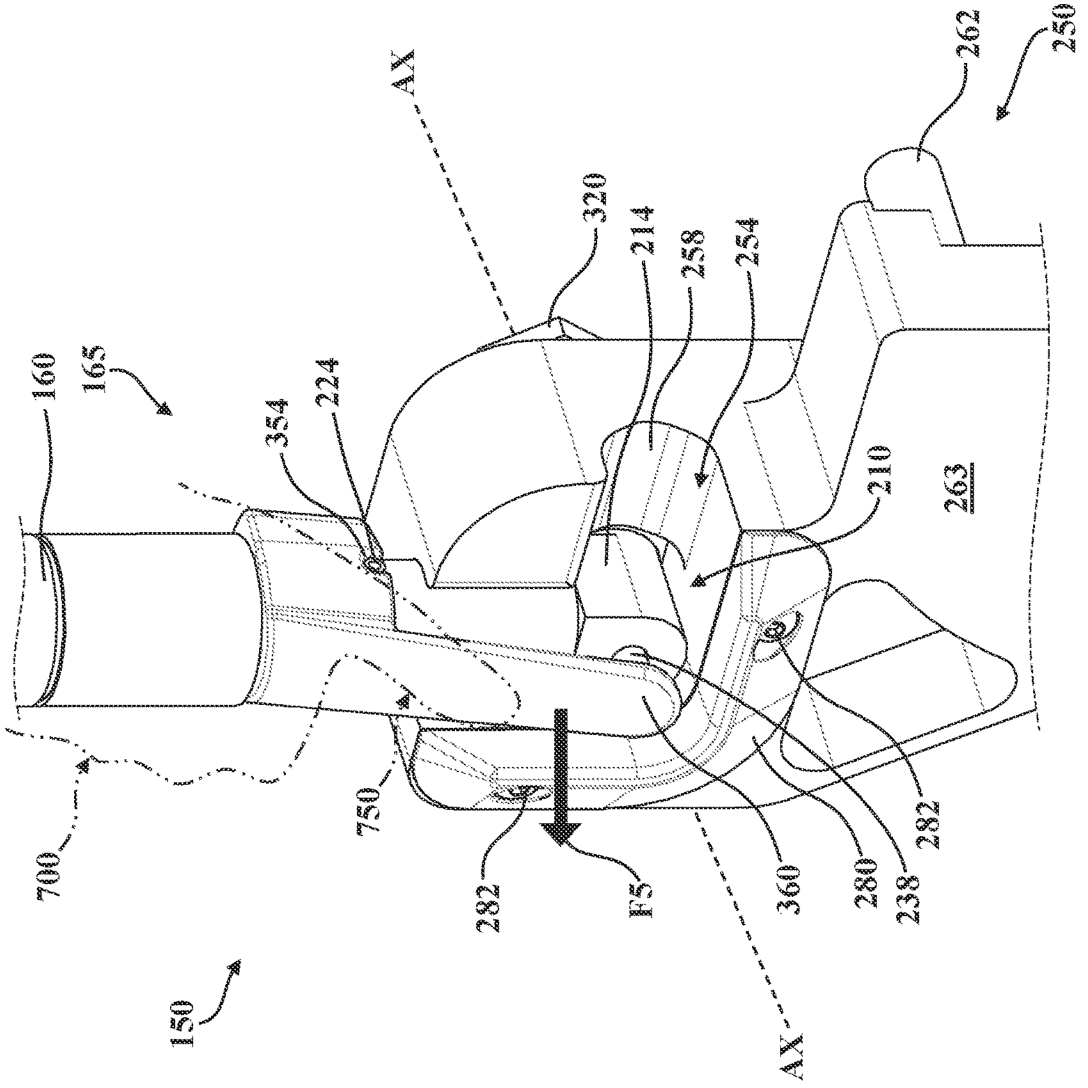
Figure 8:
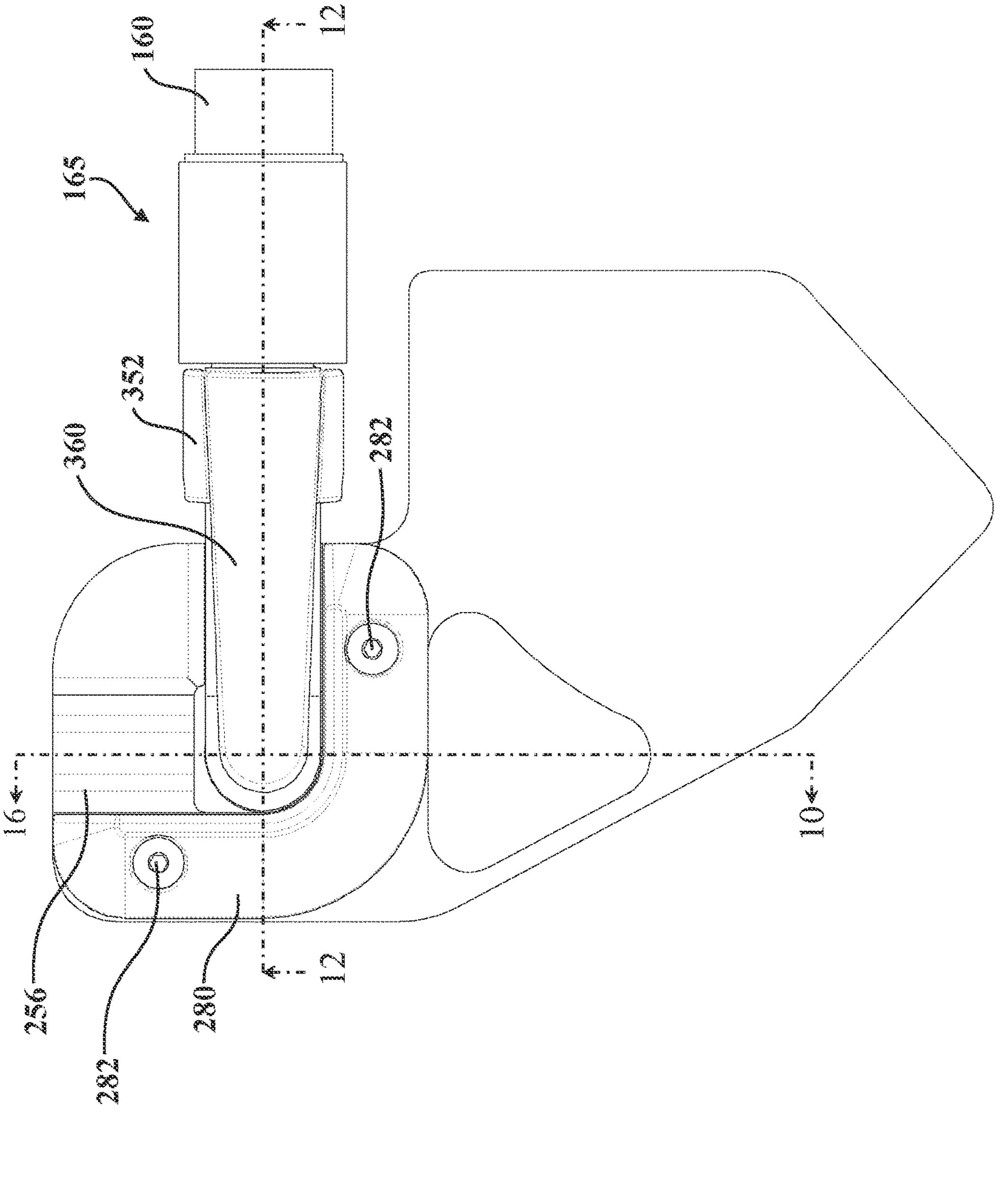
FIG. 8 is a front perspective view of the first handle assembly in the stowed position.
Figure 9:
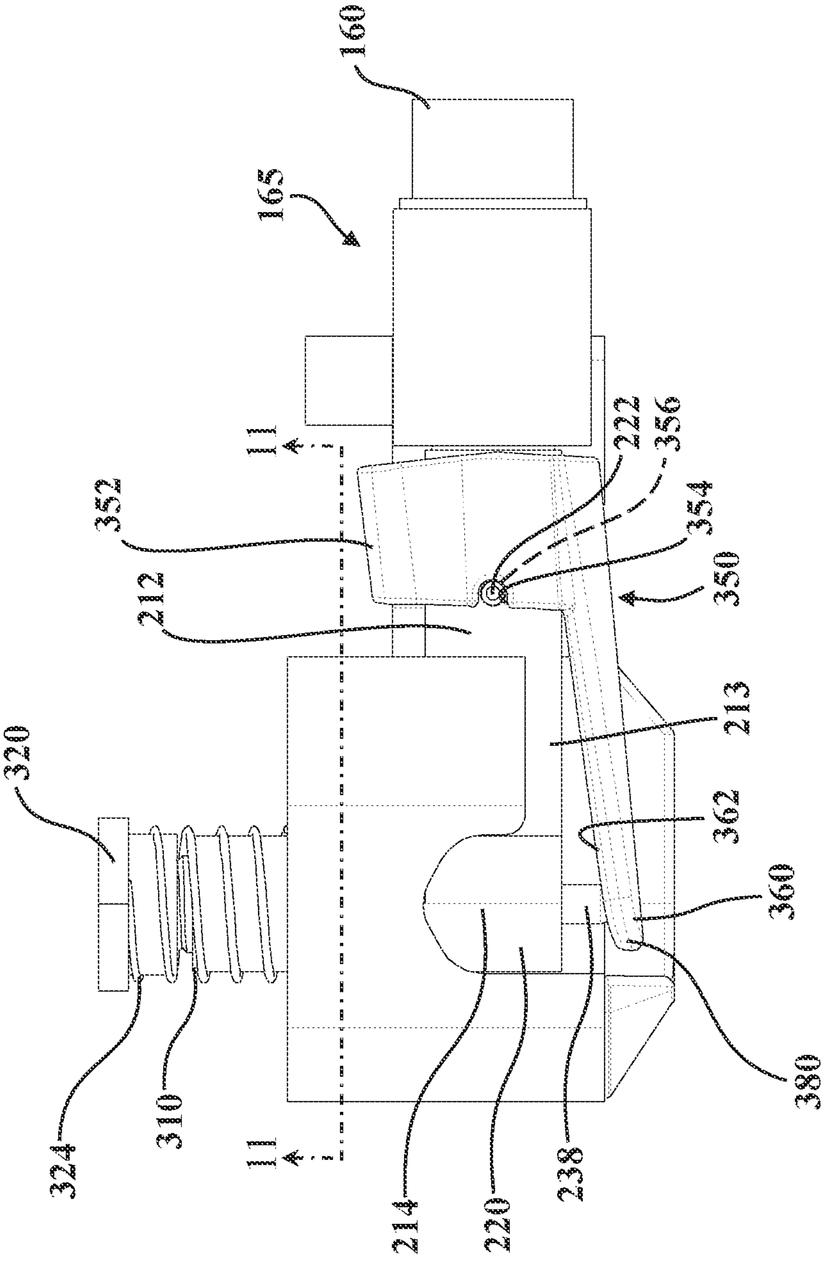
FIG. 9 is a top view of FIG. 8.

In FIG. 7A, the manual release actuator 350 is non-depressed and the locking elements are in the locked state. In FIG. 7B, the user applies a force F1 (shown being applied by the user's thumb 750) to press the actuating lever 360 to the depressed position, which places the locking elements in the unlocked state. In FIG. 7C, while continuing to press the actuating lever 360, the user further applies a force on the handle extension 160 to withdraw the handle extension 160 from the semicircular notch 258. In FIG. 7D, while continuing to press the actuating lever 360, and holding the handle extension 160 out of the semicircular notch 258, the user applies a force on the handle extension 160 to rotate the handle extension 160 to an upright orientation. In FIG. 7E, while continuing to press the actuating lever 360, the user urges (and allows the spring 310 to help urge) the handle extension 160 into the semicircular notch 256. In FIG. 7F, the user releases the actuating lever 360 and the locking elements return to their locked state with the handle assembly 150 in the use position. While FIGS. 7A-7F illustrate one of the handle assemblies 150, the same method of movement can be utilized to move each of the other one or more handle assemblies 150 from the stowed position to the use position.

FIGS. 10A-10F, 11A-11F, and 12A-12F are various cross-sections that correspond to the positions shown in FIGS. 7A-7F to better illustrate operation of the manual release actuator 350 and changes in the locking elements between the locked and unlocked states.

Figure 11A:
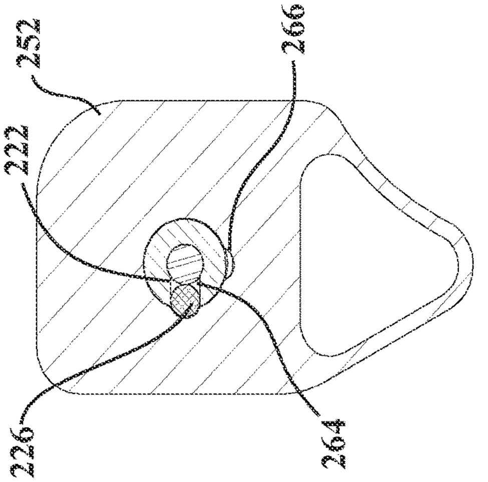
FIG. 11A is a section view of FIG. 9 taken along line 11-11 and corresponds to the positioning of the first handle assembly illustrated in FIGS. 7A and 10A.
Figure 12A:
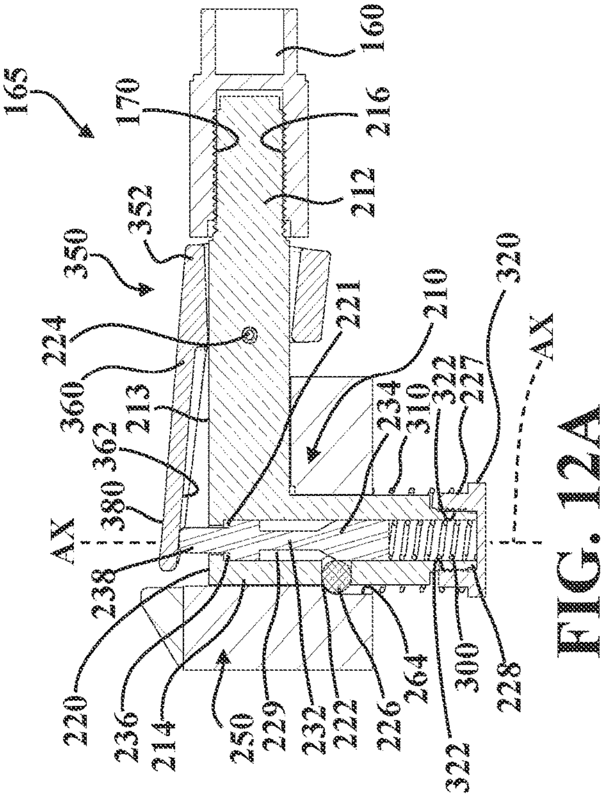
FIG. 12A is a section view of FIG. 8 taken along line 12-12 and corresponds to the positioning of the first handle assembly illustrated in FIGS. 7A, 10A and 11A.
Figure 10A:
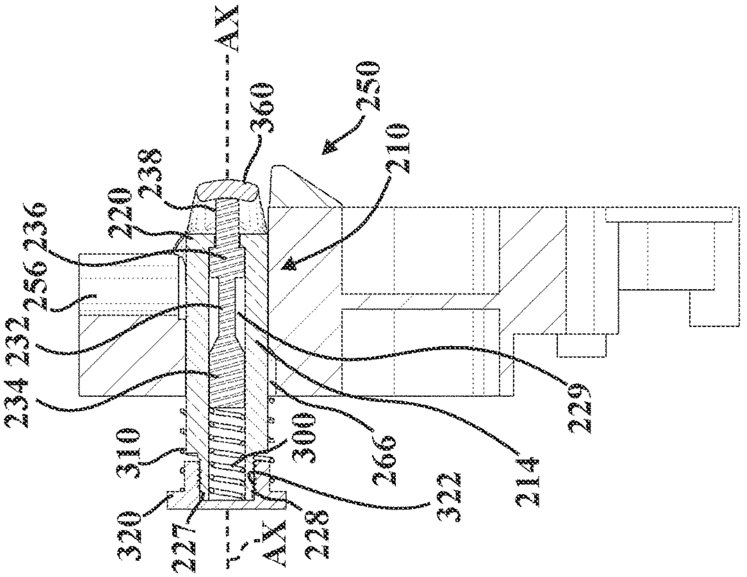
FIG. 10A is a section view of FIG. 8 taken along line 10-10 and corresponds to the positioning of the first handle assembly illustrated in FIG. 7A.

Referring first to FIGS. 10A, 11A, and 12A, which correspond to FIG. 7A, the handle assembly 150 is in the stowed position and the locking elements are in the locked state. The manual release actuator 350 is in the non-depressed position, in which the actuating lever 360 is positioned such that its inner surface 362 is angled with respect to the outer surface 213 of the handle support member 210. The spring 300 biases the plunger 230 such that the release pin section 238 extends through the pin opening 221 and is exposed between the inner surface 362 of the actuating lever 360 and the outer surface 213. As best shown in FIG. 12A, the ball bearing 226 is located in the ball opening 222 and is positioned adjacent the distal raised section 234 of the plunger 230. In this locked state, the ball bearing 226 is urged into the groove 264 through the opening 222. With the ball bearing 226 captured in the groove 264, and with the handle extension 160 positioned within the semicircular notch 258, the user is unable to rotate the handle extension 160 about axis AX relative to the base member 250. Hence, the handle assembly 150 is locked in the stowed position.

Figure 11B:
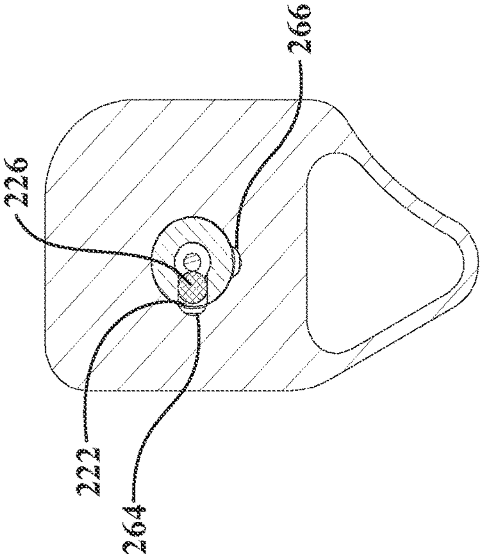
FIG. 11B is a section view of FIG. 9, also taken along line 11-11 like FIG. 11A, but corresponds instead to the positioning of the first handle assembly illustrated in FIGS. 7B and 10B.
Figure 12B:
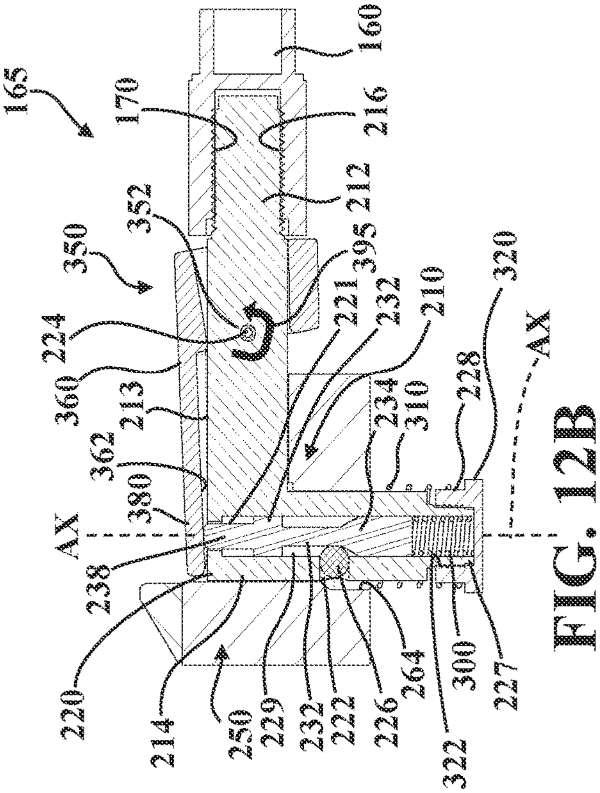
FIG. 12B is a section view of FIG. 8, also taken along line 12-12 like FIG. 12A, but corresponds instead to the positioning of the first handle assembly illustrated in FIGS. 7B, 10B and 11B.
Figure 10B:
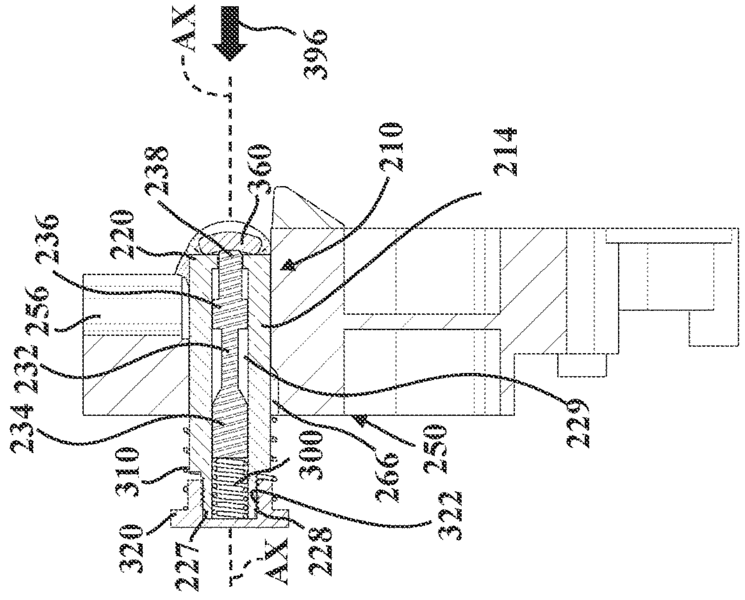
FIG. 10B is a section view of FIG. 8, also taken along line 10-10 like FIG. 10A, but corresponds instead to the positioning of the first handle assembly illustrated in FIG. 7B.
Figure 11C:
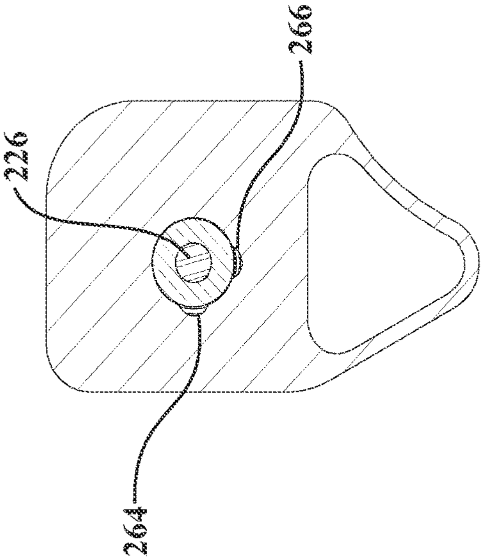
FIG. 11C is a section view of FIG. 9, also taken along line 11-11 like FIG. 11A, but corresponds instead to the positioning of the first handle assembly illustrated in FIGS. 7C and 10C.
Figure 12C:
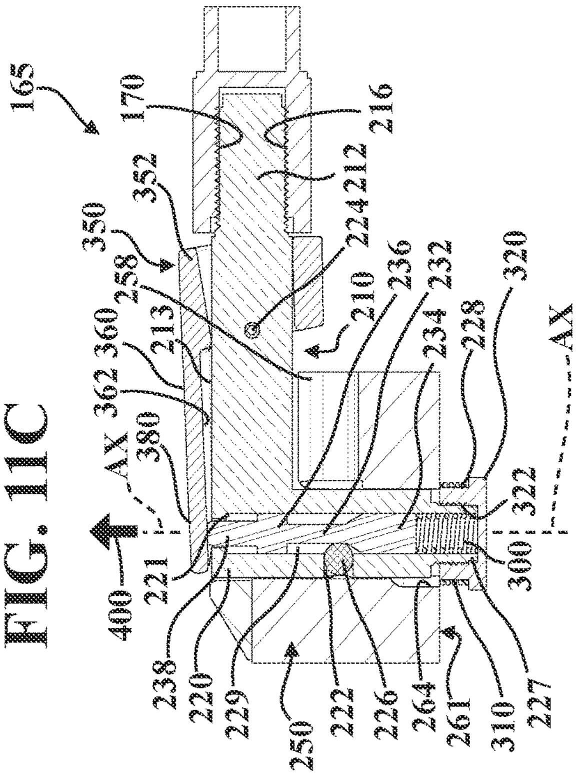
FIG. 12C is a section view of FIG. 8, also taken along line 12-12 like FIG. 12A, but corresponds instead to the positioning of the first handle assembly illustrated in FIGS. 7C, 10C and 11C.
Figure 10C:
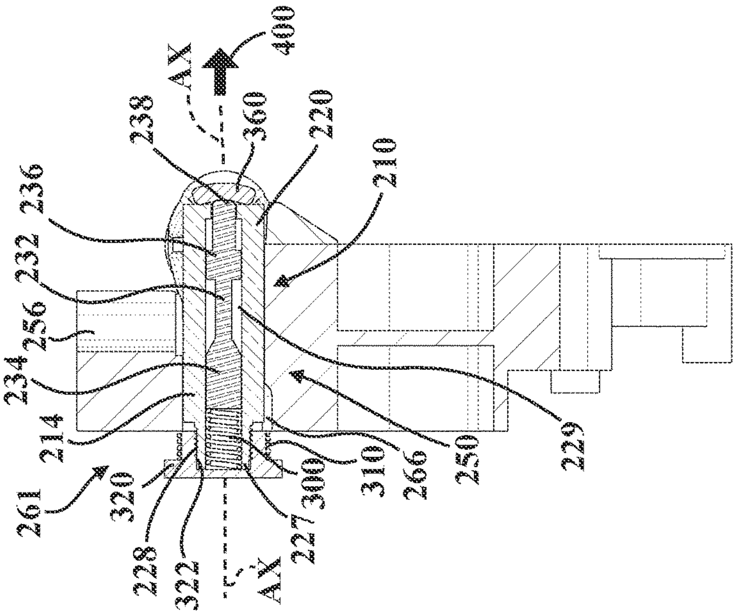
FIG. 10C is a section view of FIG. 8, also taken along line 10-10 like FIG. 10A, but corresponds instead to the positioning of the first handle assembly illustrated in FIG. 7C.

Referring next to FIGS. 10B, 11B and 12B, which correspond to FIG. 7B, in order to initiate the process for articulating the handle extension 160 from the stowed position to the use position, the user first applies a force F1 to the actuating lever 360 (i.e., depresses the actuating lever 360 with force F1 from the non-depressed position to the depressed position with the thumb 750, as shown in FIG. 7B) to rotate the manual release actuator 350 about the axis defined by the dowel pin 224 in a direction corresponding to arrow 395 (shown in FIG. 12B), thereby causing the inner surface 362 of the actuating lever 360 to move towards the outer surface 213 of the first section 212 until such time as the curved inner surface 362 is adjacent and generally extends parallel to the outer surface 213 along its entire length from the distal end 380 to the base ring portion 352 (as shown in FIG. 12B). As the inner surface 362 of the actuating lever 360 is in contact with the release pin section 238, the rotational movement of the actuating lever 360 causes the plunger 230 to move in response (i.e., translate) in a direction against the spring 300 in a direction corresponding to arrow 396 (arrow 396 shown in FIGS. 10B and 12B) to a position wherein the ball bearing 226 is adjacent to the recessed section 232 as best shown in FIG. 12B. In this position, the additional distance between the recessed section 232 and the groove 264, as compared with the distance between the distal raised section 234 and the groove 264 as in FIG. 12A, is sufficient to allow the ball bearing 226 to no longer be urged/captured in the groove 264 through the opening 222 and thus be movable as described below.

Next, the user applies force (shown as force F2 in FIG. 7C) to the handle extension 160 or any components moveable with the handle extension 160 in a direction away from the cap 320 while maintaining thumb force F1. The movement of the handle extension 160 results in the coordinated movement of the handle support member 210 and cap 320 in the direction shown by arrow 400 (see FIGS. 10C and 12C) relative to the stationary base member 250 such that the handle extension 160 (and handle support member 210 thereof) is no longer positioned within the semicircular notch 258. The movement of the cap 320 also results in the compression of the spring 310 between the cap 320 and the rearward side 261 of the body portion 252. The total movement of the handle extension 160 and cap 320 in the direction corresponding to arrow 400 is limited to a position wherein the cap 320 is moved into a position adjacent to and abutting the rearward side 261 of the body portion 252 of the base member 250 (compare with the spaced relationship as shown in FIG. 12A). The movement of the handle extension 160 also causes the ball bearing 226 to be removed from the groove 264 while remaining adjacent to the recessed section 232 of the plunger 230. As such, the ball bearing 226 no longer restricts movement of the handle extension 160 from out of the semicircular notch 258. This corresponds to the unlocked state.

Figure 11D:
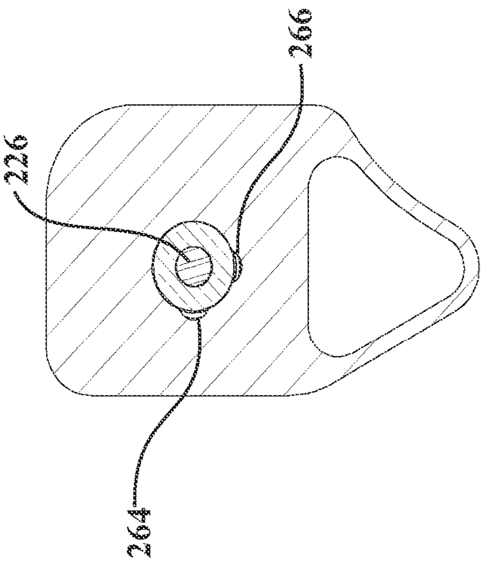
FIG. 11D is a section view of FIG. 9, also taken along line 11-11 like FIG. 11A, but corresponds instead to the positioning of the first handle assembly illustrated in FIGS. 7D and 10D.
Figure 12D:
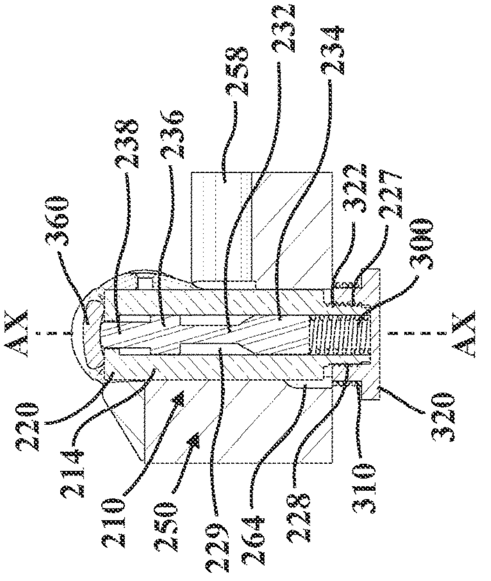
FIG. 12D is a section view of FIG. 8, also taken along line 12-12 like FIG. 12A, but corresponds instead to the positioning of the first handle assembly illustrated in FIGS. 7D, 10D and 11D.
Figure 10D:
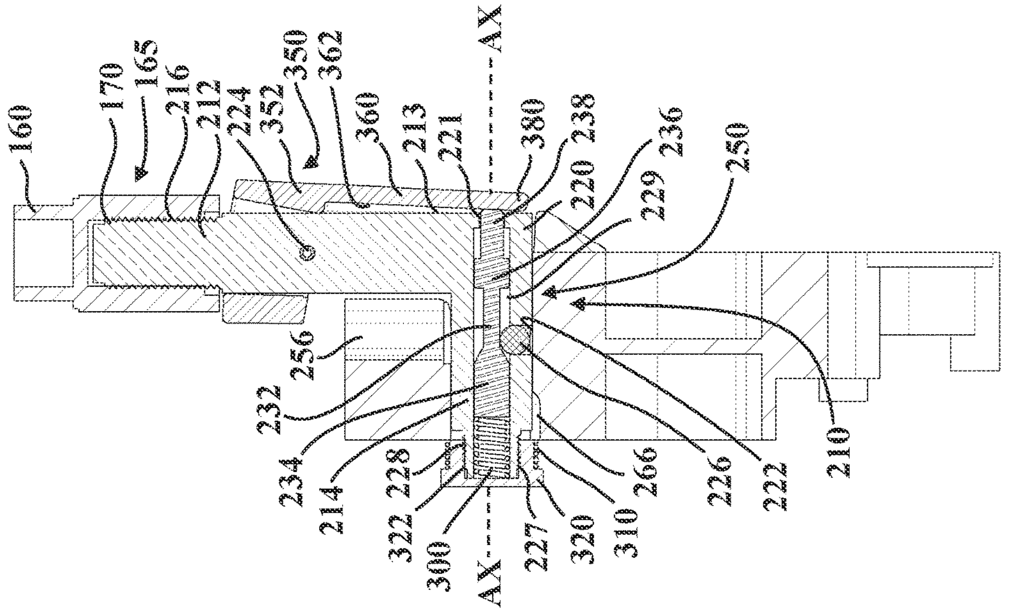
FIG. 10D is a section view of FIG. 8, also taken along line 10-10 like FIG. 10A, but corresponds instead to the positioning of the first handle assembly illustrated in FIG. 7D.
Figure 12E:
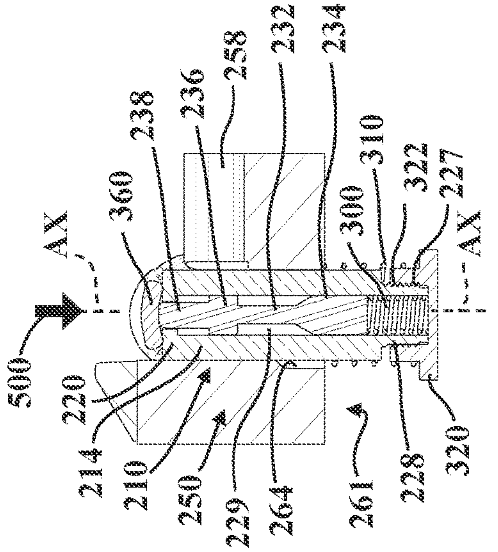
FIG. 12E is a section view of FIG. 8, also taken along line 12-12 like FIG. 12A, but corresponds instead to the positioning of the first handle assembly illustrated in FIGS. 7E, 10E and 11E.
Figure 10E:
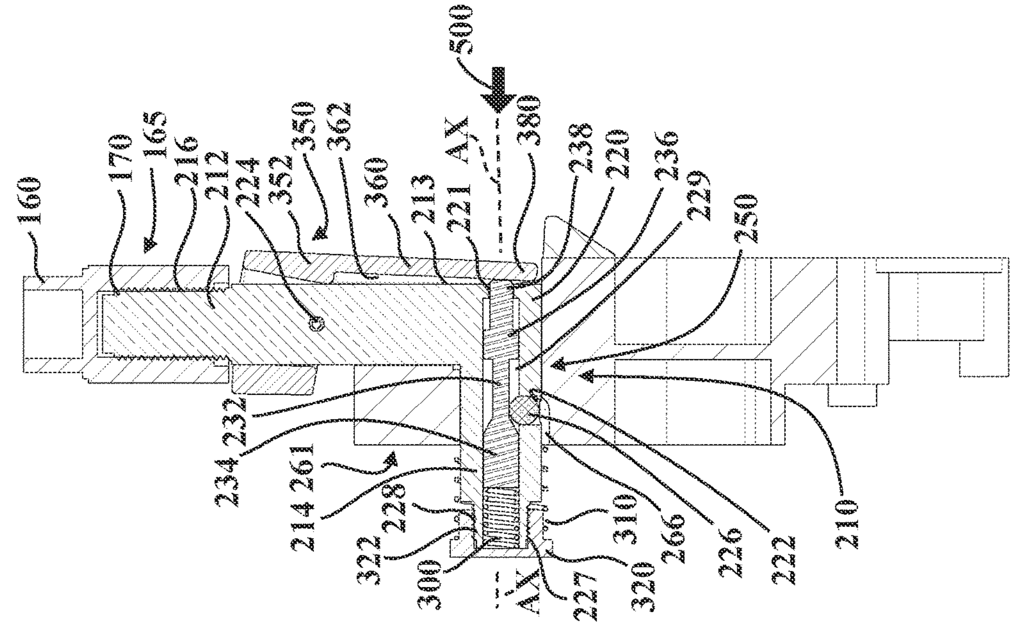
FIG. 10E is a section view of FIG. 8, also taken along line 10-10 like FIG. 10A, but corresponds instead to the positioning of the first handle assembly illustrated in FIG. 7E.

As shown next in FIGS. 10D, 11D and 12D, which correspond to FIG. 7D, the user has rotated the handle extension 160 about the axis AX by applying force F3 (see FIG. 7D) while maintaining thumb force F1 such that the handle extension 160 is now aligned with the semicircular notch 256 (as best shown in FIG. 7D), but not yet locked the handle extension 160 from rotation within the semicircular notch 256. The locking elements thus remain in the unlocked state.

Next, the user applies force (shown as force F4 in FIG. 7E) to the handle extension 160 or any components moveable with the handle extension 160 while maintaining thumb Force F1, which is assisted by the spring bias of spring 310 positioned between the cap 320 and the rearward side 261 of the base member 250. The movement of the handle extension 160 results in the coordinated movement of the handle support member 210 and cap 320 in the direction shown by arrow 500 (see FIGS. 10E and 12E) relative to the stationary base member 250 such that the handle extension 160 is contained within the semicircular notch 256. The movement of the cap 320 also results in the decompression of the spring 310 (which again, as noted above, assists in the movement of the handle extension 160) such that the cap 320 is moved to a position in a spaced relationship from the rearward side 261 of the body portion 252, as shown best in FIG. 12E. The movement of the handle support member 210 also causes the ball bearing 226 to be positioned above the second locking groove 266 associated with the use position, but wherein the ball bearing 226 is not yet urged/captured in the second locking groove 266 by the plunger 230 through the opening 222. In cases (not shown) in which the user has already released the actuating lever 360, the ball bearing 226 will find the second locking groove 266 when aligned to realize the locked state. Otherwise, the user may release the actuating lever 360 once moved to the use position, as described below such that the ball bearing 226 seats into the second locking groove 266.

Figure 11E:
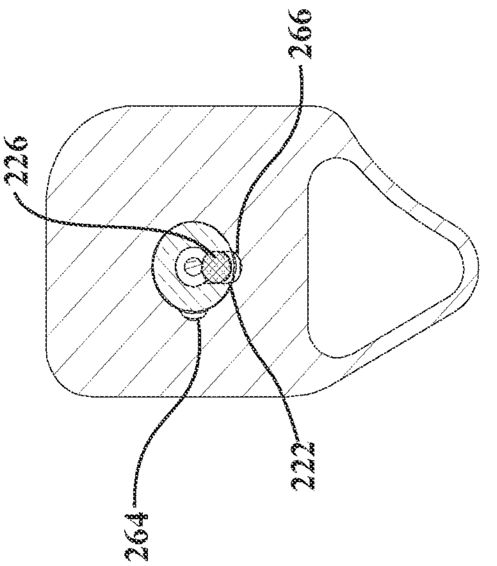
FIG. 11E is a section view of FIG. 9, also taken along line 11-11 like FIG. 11A, but corresponds instead to the positioning of the first handle assembly illustrated in FIGS. 7E and 10E.
Figure 11F:
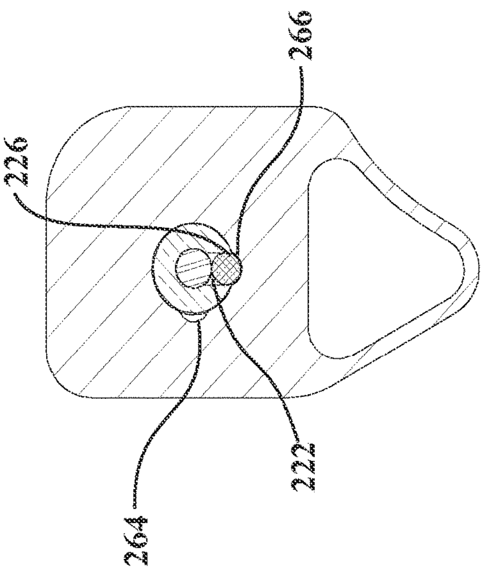
FIG. 11F is a section view of FIG. 9, also taken along line 11-11 like FIG. 11A, but corresponds instead to the positioning of the first handle assembly illustrated in FIGS. 7F and 10F.
Figure 12F:
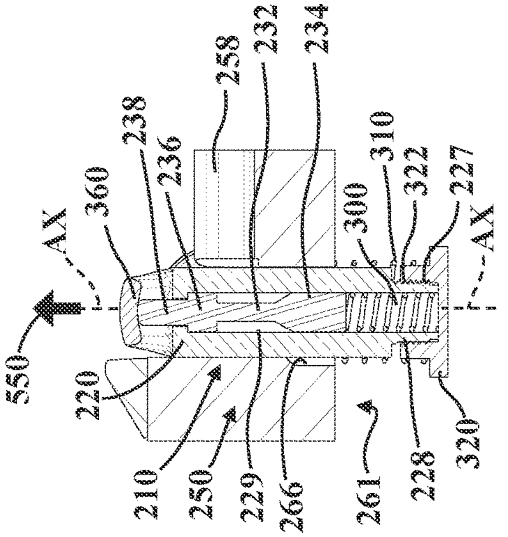
FIG. 12F is a section view of FIG. 8, also taken along line 12-12 like FIG. 12A, but corresponds instead to the positioning of the first handle assembly illustrated in FIGS. 7F, 10F and 11F.
Figure 10F:
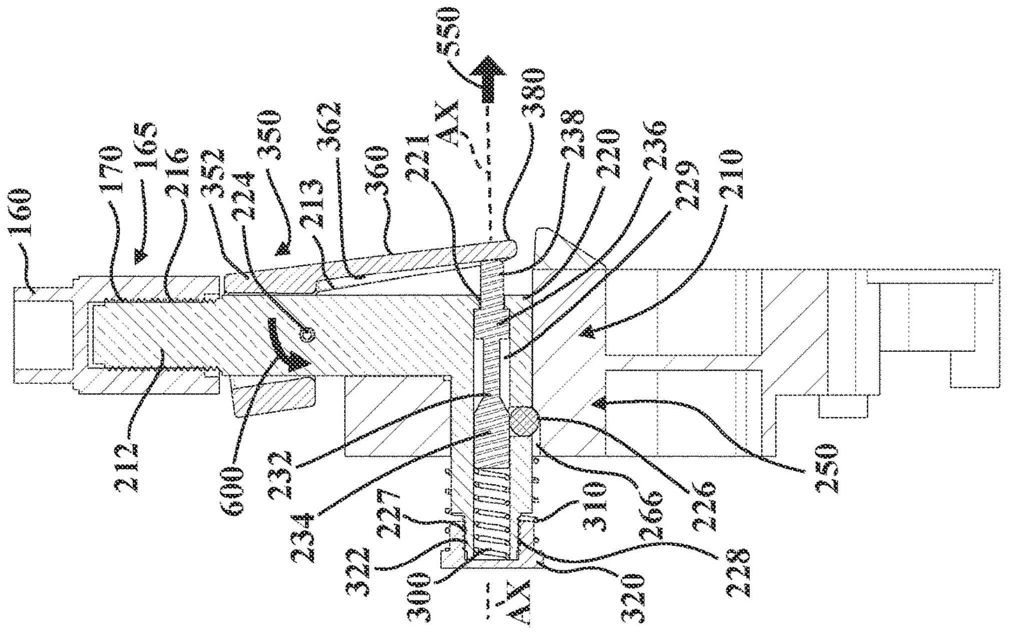
FIG. 10F is a section view of FIG. 8, also taken along line 10-10 like FIG. 10A, but corresponds instead to the positioning of the first handle assembly illustrated in FIG. 7F.

As illustrated in FIGS. 10F, 11F and 12F, which correspond to FIG. 7F, the user removes the thumb force F1 they were applying to the actuating lever 360. The biasing force (shown as F5 in FIG. 7F) of the spring 300 pushes the plunger 230 in a direction according to arrow 550 (see FIGS. 10F and 12F), which moves the release pin section 238 through the pin opening 221, thereby rotating the manual release actuator 350 about the axis defined by the length of the dowel pin 224 in a rotational direction represented by arrow 600 (see FIG. 10F), thereby causing the inner surface 362 of the actuating lever 360 to move away from the outer surface 213 of the first section 212 such that the curved inner surface 362 is remote from the outer surface 213 along its length from the distal end 380 to the base ring section 352 (i.e., the actuating lever 360 is returned to the non-depressed position from the depressed position). The spring 300 also moves the plunger 230 so that the distal raised section 234 presses the ball bearing 226 into the second locking groove 266 through the ball opening 222. Thus, the locking elements are back in the locked state. Accordingly, the handle extension 160 cannot be rotated about axis AX because it is contained within the semicircular notch 256 and because the ball bearing 226 is urged/captured in the second locking groove 266, which corresponds to the use position. In this use position, the user may then apply leverage to the handle extension 160 to maneuver the patient transport apparatus 30 in the direction desired.

Referring now to FIGS. 13-21, three alternative embodiments that are associated with handle assemblies that are moveable between a stowed position and a use position are also provided herein.

Figure 13:
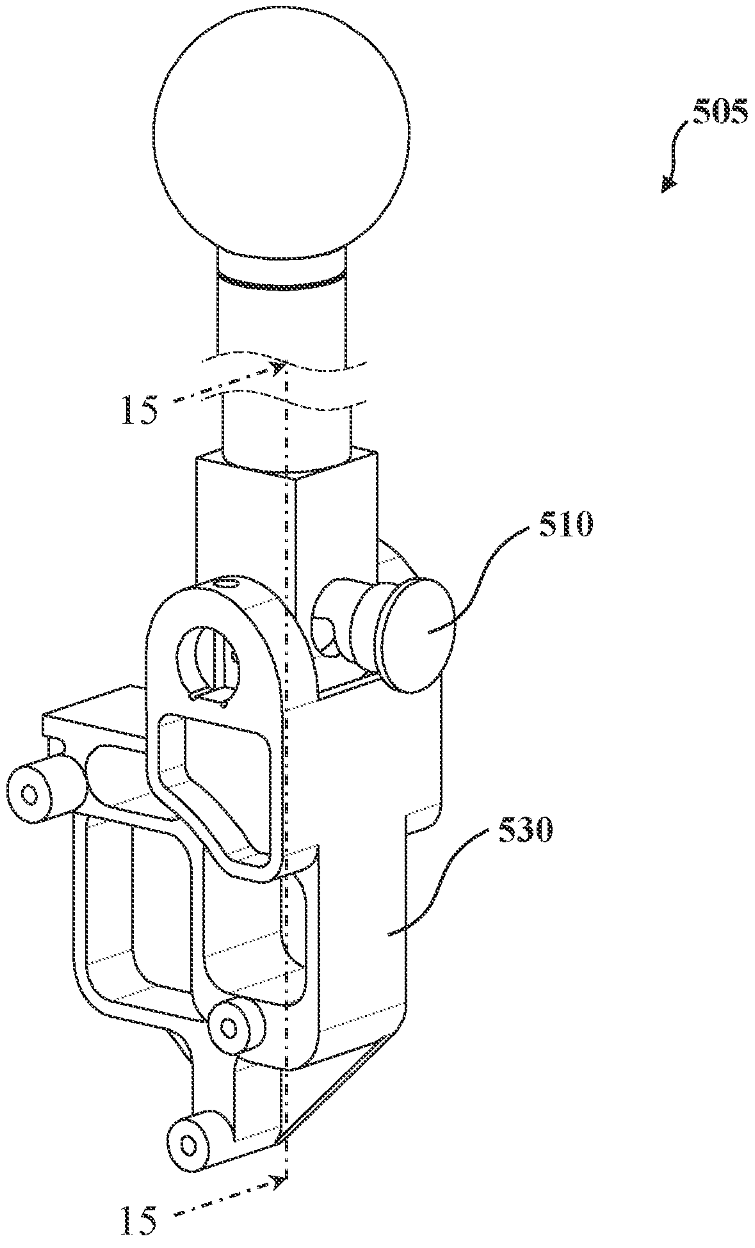
FIG. 13 is a perspective view of a handle assembly according to another embodiment.
Figure 14:
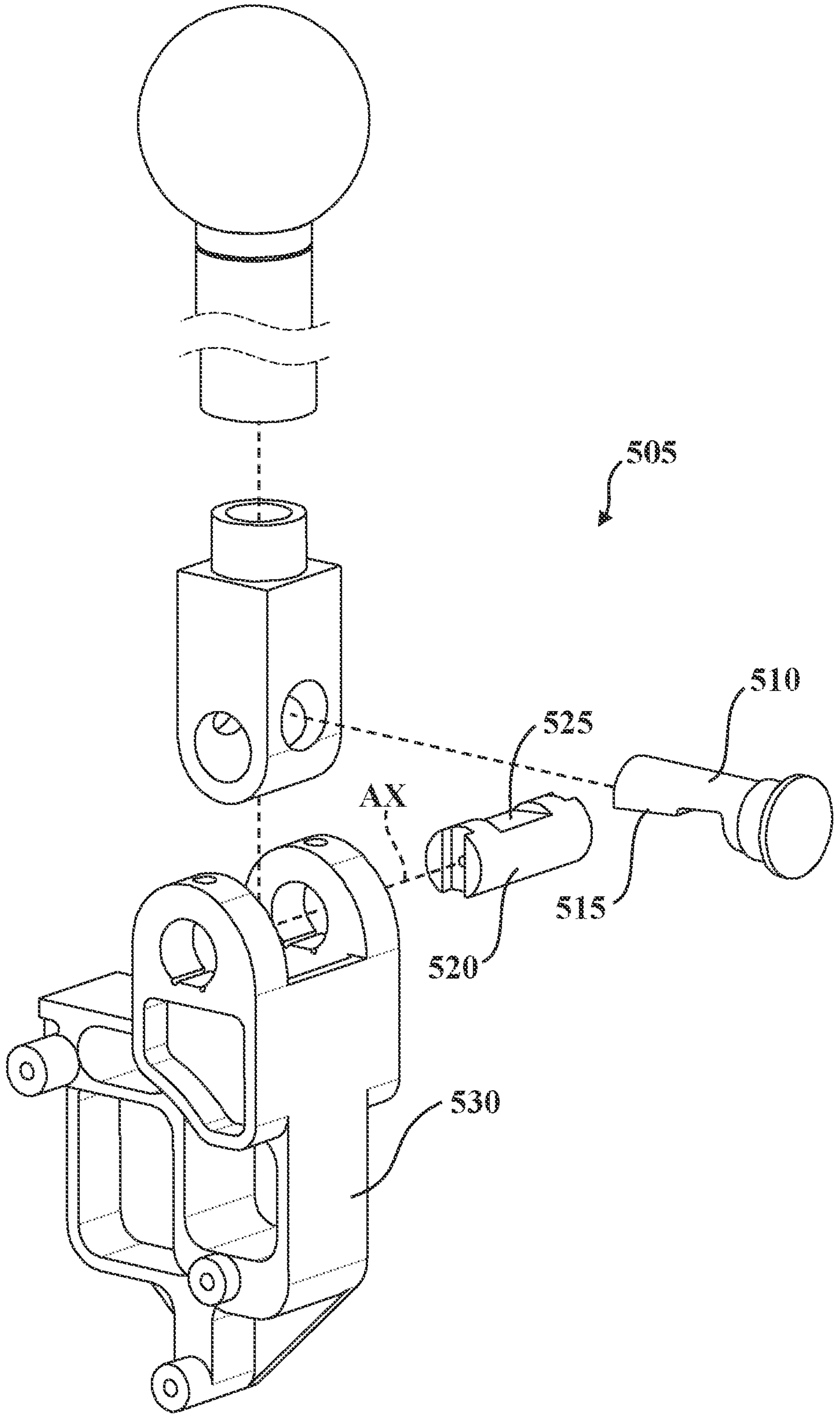
FIG. 14 is an exploded view of the handle assembly of FIG. 13.
Figure 15:
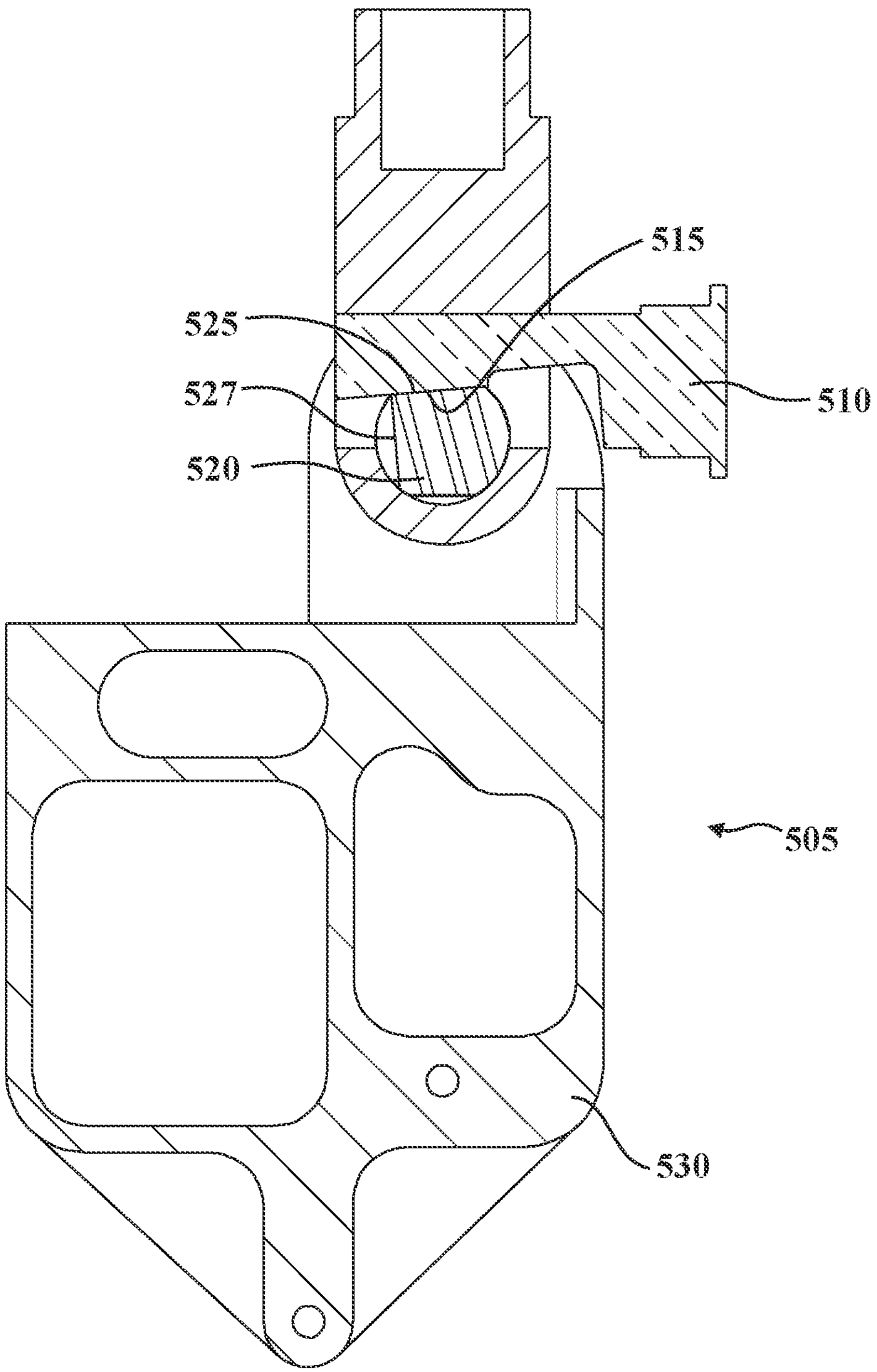
FIG. 15 is a section view of FIG. 13 taken along line 15-15.

One alternative handle assembly 505 is shown in FIG. 13-15, which employs a spring-biased wedge pin 510 to lock and unlock the handle assembly 505, as opposed to a ball bearing as in the embodiment of FIGS. 1-12F as described above. Referring to FIG. 15, the wedge pin 510 has a flat section 515. When the handle assembly 505 is in the use position, the flat section 515 of the wedge pin 510 has face to face contact with a flat section 525 of a cot pin 520 (which is fixed to the base member 530), thereby restricting the rotation of the handle assembly 505 from the use position (such as shown in FIGS. 13-15) to the stowed position (not shown), or the stowed position to the use position. To unlock the handle assembly 505 from the use position and move it to the stowed position, the wedge pin 510 is pressed in, which removes the face to face contact with the cot pin 520, and allows the handle assembly 505 to rotate freely about the axis AX (see FIG. 14) of the cot pin 520. Once the handle assembly 505 has been rotated to the stowed position, the wedge pin 510 is released, thereby causing face to face contact of the flat section 515 with another flat section 527 of the cot pin 520 and again restricting rotation of the handle assembly 505.

Figure 16:
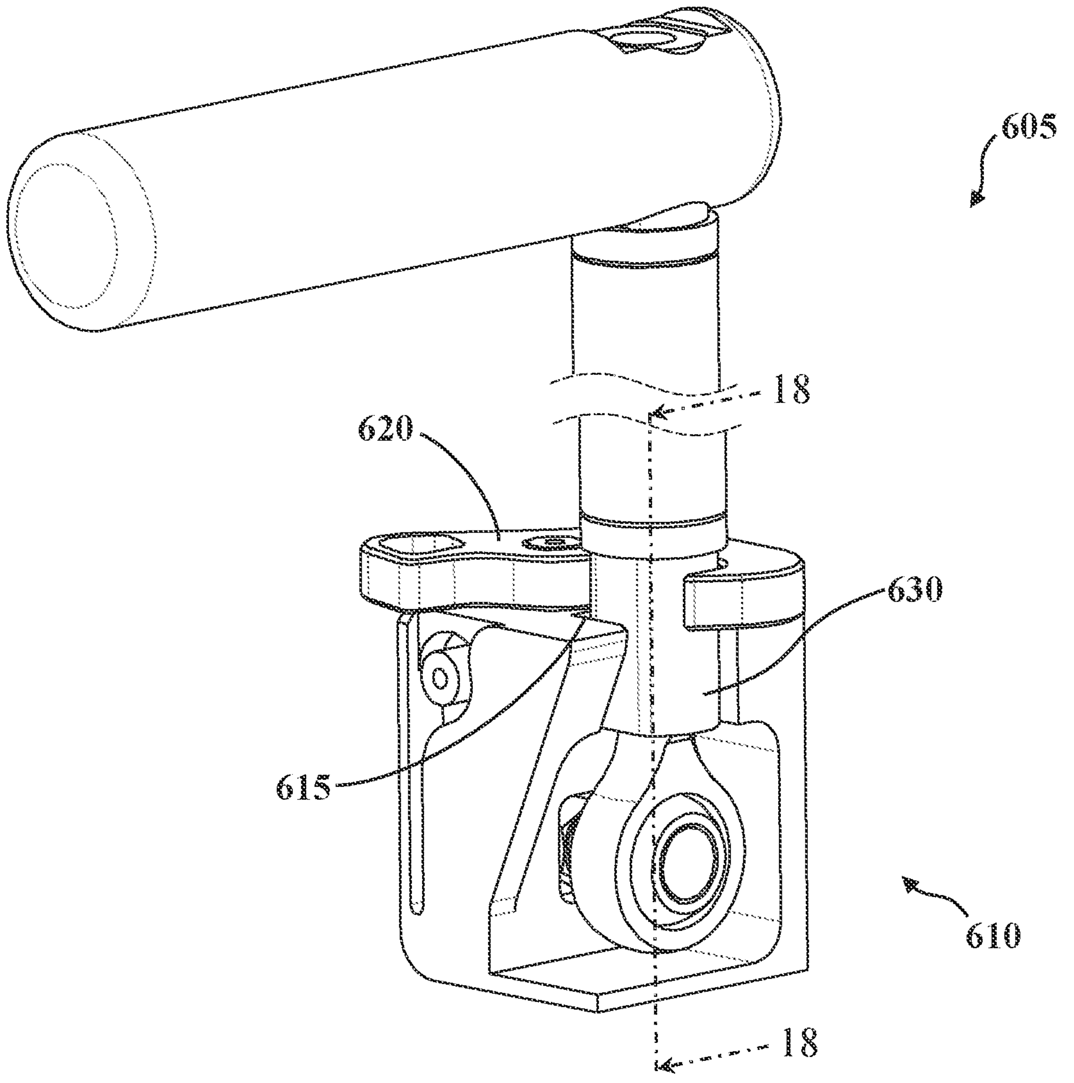
FIG. 16 is a perspective view of a handle assembly according to yet another embodiment.
Figure 17:
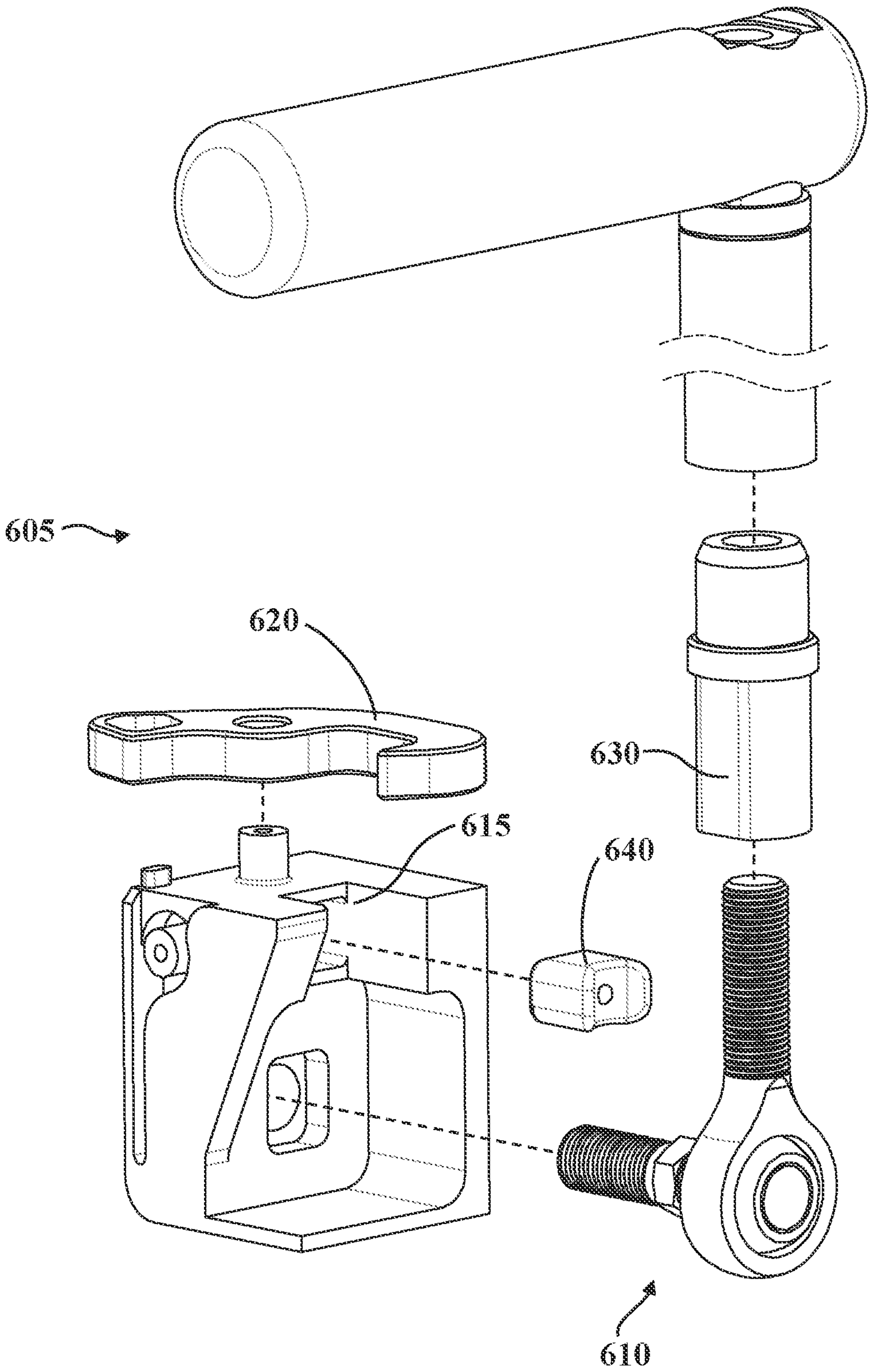
FIG. 17 is an exploded view of the handle assembly of FIG. 16.
Figure 18:
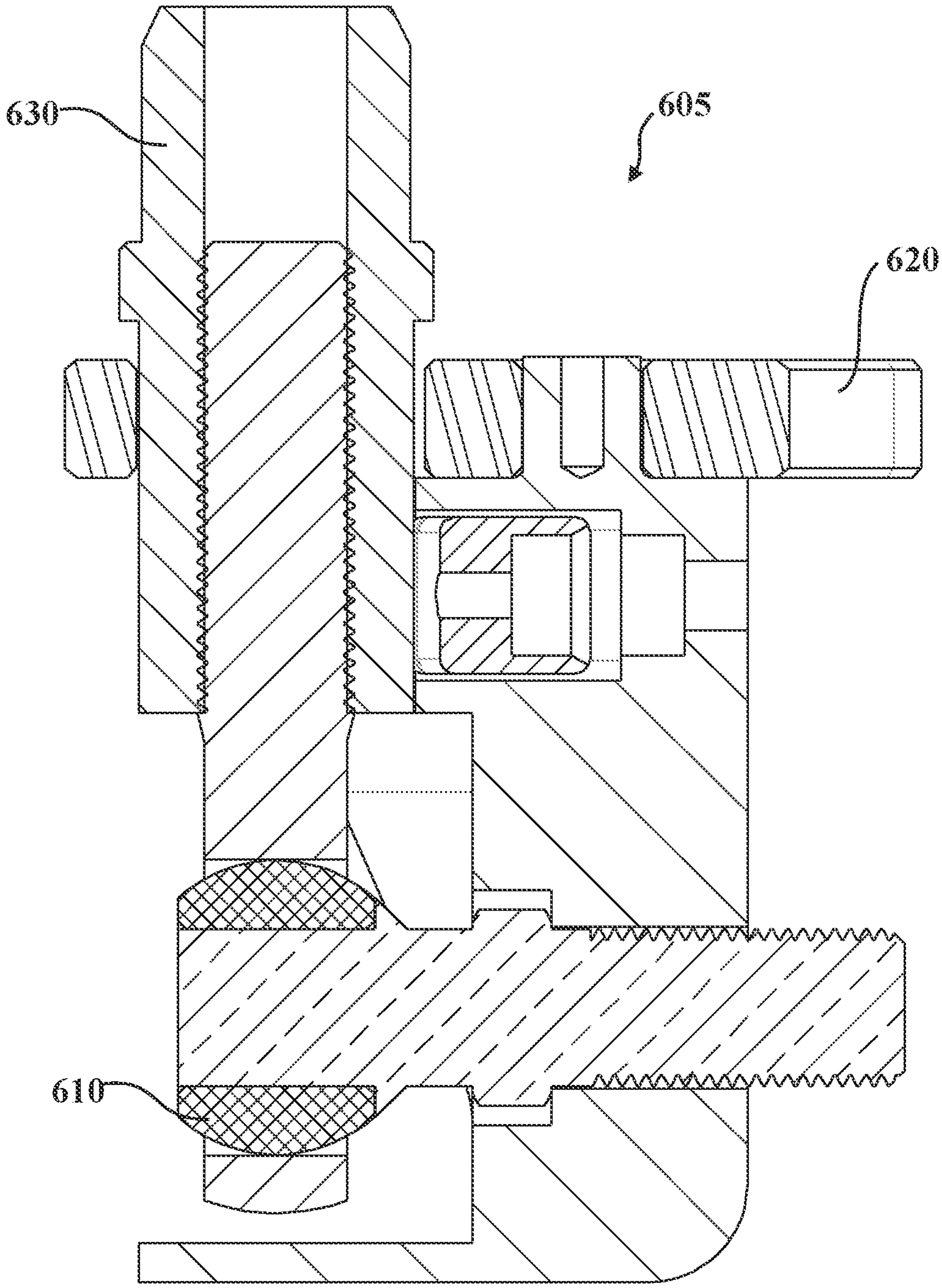
FIG. 18 is a section view of FIG. 16 taken along line 18-18.

Another alternative handle assembly 605 is shown in FIGS. 16-18, which has a ball and socket type articulating joint 610. The handle assembly 605 is held in the use position in a notch 615 by a rotational lock 620. To move the handle assembly 605 from the use position shown in FIGS. 16 and 18 to the stowed position, the rotational lock 620 is manually released and held by a user against the bias of a locking spring (not shown) until handle extension 630 is completely free of the rotational lock 620. Then, the handle assembly 605 is moved by the user to the stowed position via the articulating joint. To return to the use position, the handle assembly 605 is moved back toward the use position and the handle extension 630 is pressed against an arcuate surface of the rotational lock 620 until the rotational lock 620 is moved to allow receipt of the handle extension 630 back into the notch 615. Once the handle extension 630 is seated in the notch 615, the rotational lock 620 snaps back into place at least partially about the handle extension 630, causing the handle assembly 605 to be locked into place in the notch 615. A spring-loaded plunger 640 (see FIG. 17) is pushing on the handle extension 630, opposite the rotational lock 620, to reduce the amount of free movement, or slop, of the handle assembly 605.

Figure 19:
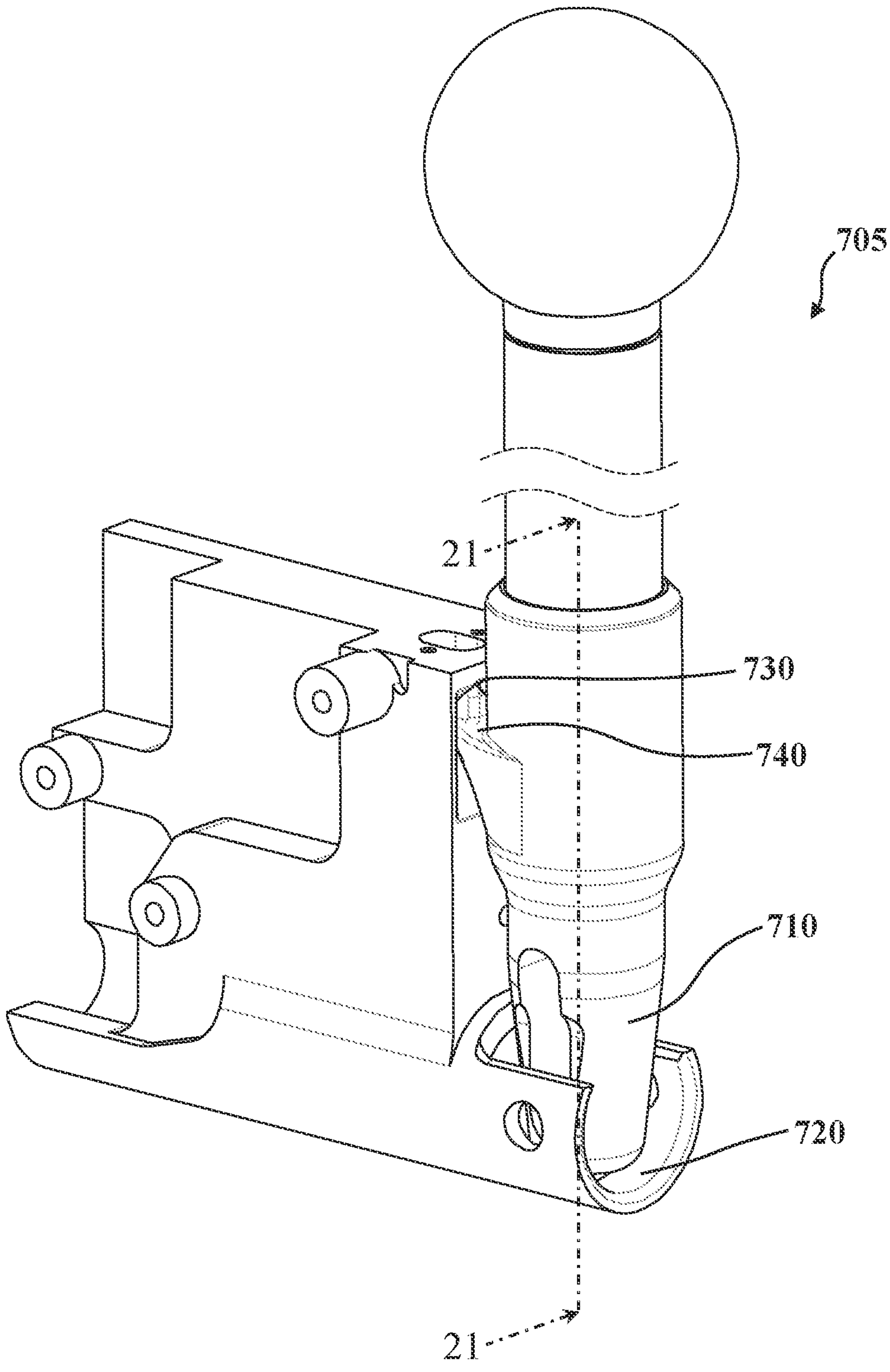
FIG. 19 is a perspective view of a handle assembly according to still another embodiment.
Figure 20:
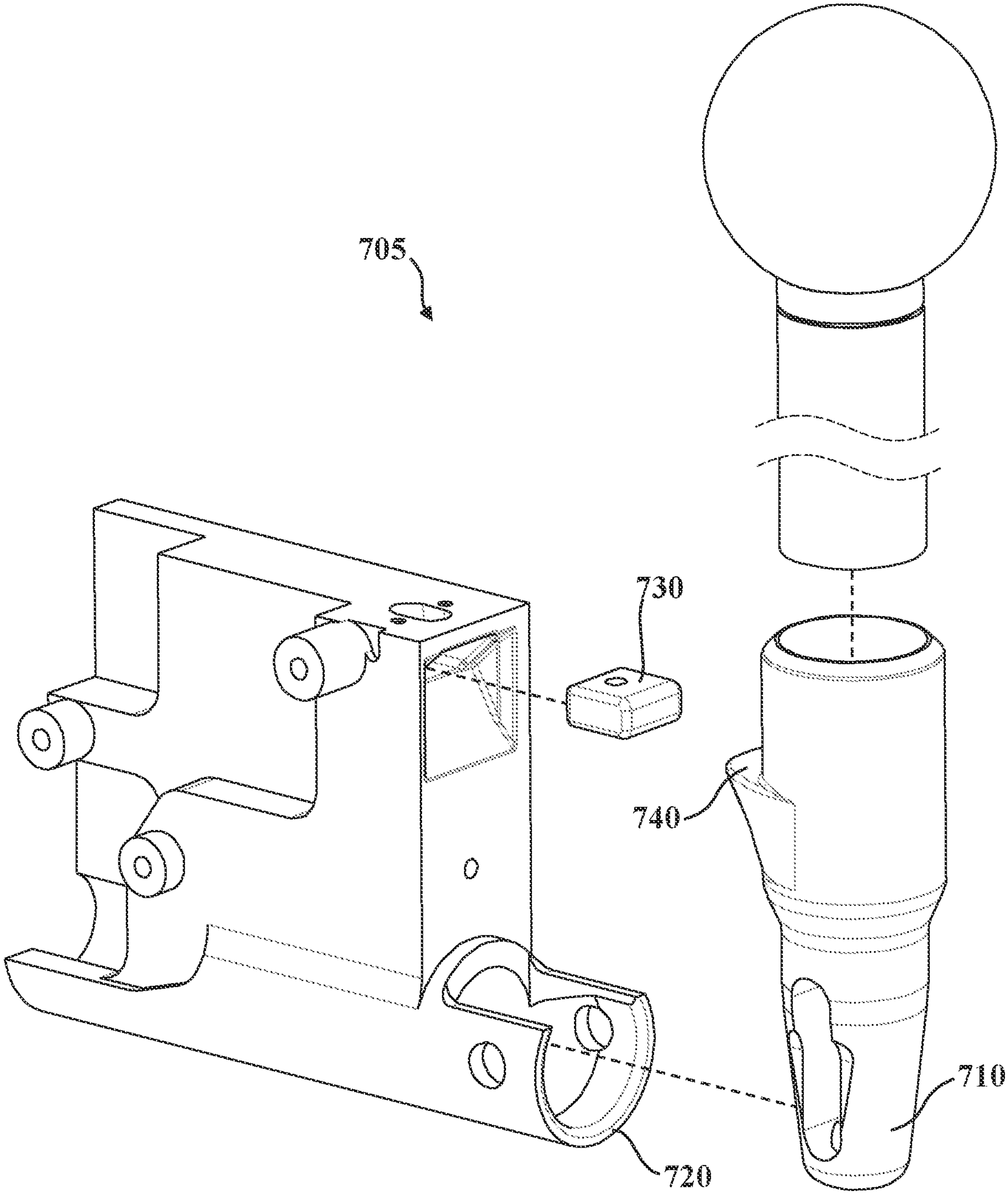
FIG. 20 is an exploded view of the handle assembly of FIG. 19.
Figure 21:
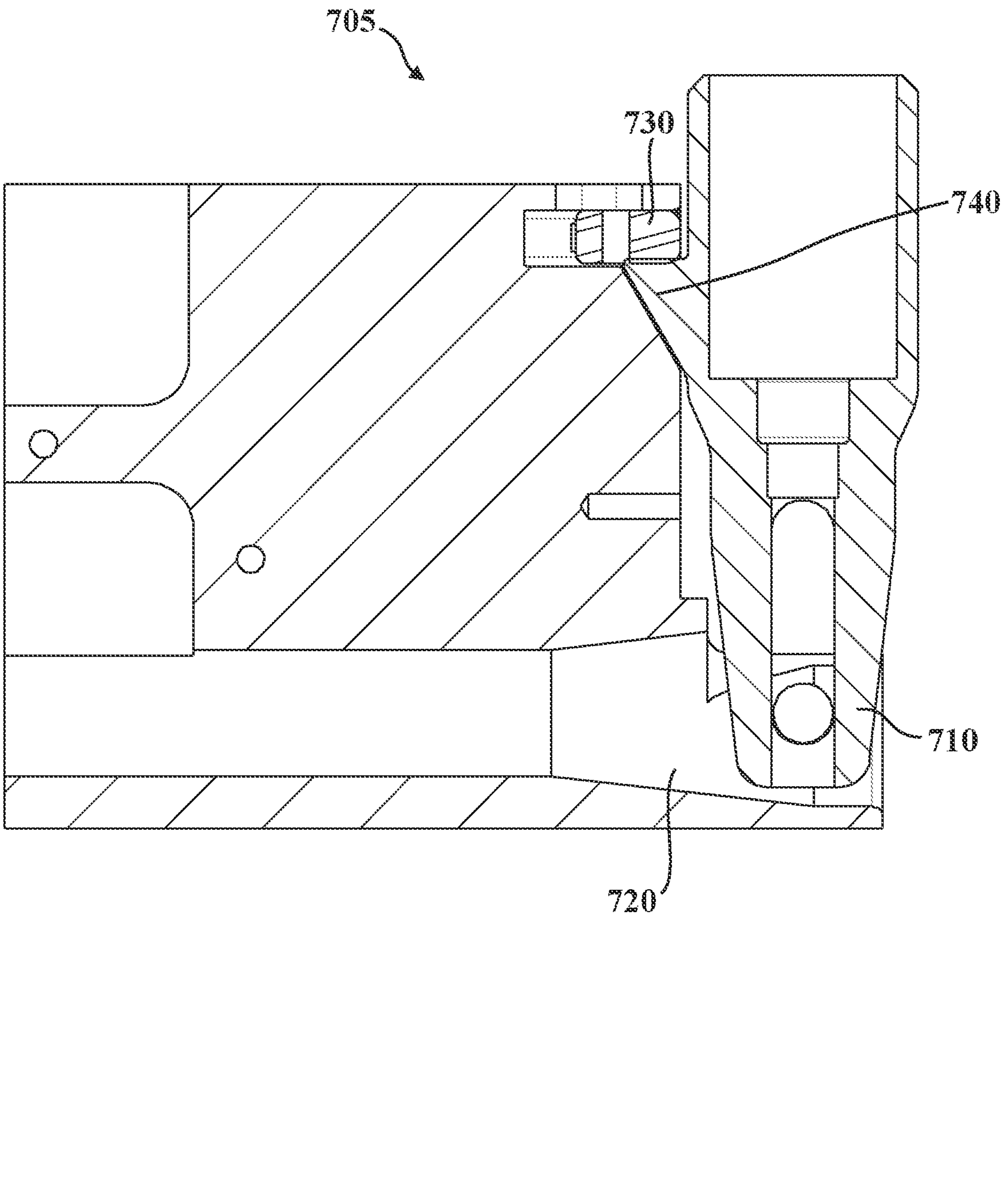
FIG. 21 is a section view of FIG. 19 taken along line 21-21.

A third alternative handle assembly 705 is shown in FIGS. 19-21. The handle assembly 700 has a handle extension with a tapered stem 710 that rests in a socket 720 on a base member. A pin (not shown) couples the tapered stem 710 to the socket 720. To place the handle assembly 705 in the use position (such as shown in FIGS. 19 and 21), the tapered stem 710 is rotated to an upright position (the term "upright" merely refers to the relative orientation of the tapered stem 710 as illustrated in FIGS. 19 and 21 and is not intended to require the stem to upright relative to the ground or any portion of the patient transport apparatus 30 of this embodiment when the handle assembly 705 is installed). When the handle assembly 705 is rotated to the upright position, a spring-biased wedge 730 locks on top of a shelf 740 on the handle extension to place the handle assembly 705 in the use position. More specifically, when the user rotates the handle extension towards the use position, the shelf 740 engages and pushes the wedge 730 against a locking spring (not shown). Once the handle extension is fully upright, then the wedge 730 clears the shelf 740 and snaps into place above the shelf 740 to hold the handle extension in position (see FIG. 21). To unlock the handle assembly 705 from the stowed position, the wedge 730 is released (e.g., via a button or pin that slides the wedge 730 away from the shelf 740) until the handle extension is free to rotate back to the stowed position. The handle extension is then rotated such that the tapered stem 710 is aligned with the socket 720 in the stowed position. It should be appreciated that in this embodiment, the use position described above could alternatively be the stowed position, and the stowed position described above could be the use position, depending on how the third alternative handle assembly 705 is installed.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for transporting a patient, the patient transport apparatus comprising:
- a support structure comprising a base, a frame, and a patient support surface to support the patient;
- wheels coupled to the base to facilitate movement of the support structure; and
- a handle assembly including:
  - a base member operatively attached to the frame,
  - a handle to be manipulated by a user to manually move the support structure, and
  - a handle extension supporting the handle and being movably coupled to the base member for articulation relative to the frame between a stowed position and a use position such that the handle is adjacent to the frame in the stowed position and the handle is extended from the frame by the handle extension in the use position, and
  - a locking device operable between a locked state and an unlocked state to discretely lock and unlock the handle assembly relative to the frame, the locking device including a rotational lock pivotably coupled to the base member and arranged to abut least a portion of the handle assembly in the locked state to retain the handle extension in the use position.

2. The patient transport apparatus of claim 1, wherein the handle assembly further includes an articulating joint operatively attached to the base member and supporting the handle extension for articulation between the stowed position and the use position.

3. The patient transport apparatus of claim 2, wherein the articulating joint supports the handle extension for articulation in a plurality of degrees of freedom.

4. The patient transport apparatus of claim 3, wherein the plurality of degrees of freedom include at least one rotational degree of freedom.

5. The patient transport apparatus of claim 2, wherein the articulating joint comprises a spherical joint supporting the handle extension for pivoting articulation in at least two rotational degrees of freedom relative to the base member.

6. The patient transport apparatus of claim 5, wherein the spherical joint is configured for threaded engagement with the handle extension.

7. The patient transport apparatus of claim 1, wherein the base member defines a notch shaped to receive at least a portion of the handle extension in the locked state.

8. The patient transport apparatus of claim 7, wherein the base member supports a plunger adjacent to the notch for engaging the handle extension to at least partially limit free movement of the handle assembly.

9. The patient transport apparatus of claim 8, wherein the plunger defines a curved face for engaging the handle extension.

10. The patient transport apparatus of claim 9, wherein the plunger is biased towards the handle extension in the locked state.

11. The patient transport apparatus of claim 8, wherein the plunger has a non-circular profile.

12. The patient transport apparatus of claim 1, wherein the locking device is biased towards the locked state.

13. The patient transport apparatus of claim 12, wherein the rotational lock defines an arcuate surface arranged for abutment with the handle extension to pivot the rotational lock relative to the base member as the handle extension articulates into the use position.

14. The patient transport apparatus of claim 1, wherein the rotational lock is arranged for user engagement to move the locking device from the locked state to the unlocked state.

* * * * *